US011705975B2

(12) United States Patent
Raghavan et al.

(10) Patent No.: US 11,705,975 B2
(45) Date of Patent: Jul. 18, 2023

(54) MEASUREMENT GAP CONFIGURATION FOR MULTI-TRP ANTENNA CALIBRATION

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/332,572

(22) Filed: May 27, 2021

(65) Prior Publication Data

US 2021/0409128 A1 Dec. 30, 2021

Related U.S. Application Data

(60) Provisional application No. 63/044,644, filed on Jun. 26, 2020.

(51) Int. Cl.
*H04B 17/12* (2015.01)
*H04W 24/10* (2009.01)
(Continued)

(52) U.S. Cl.
CPC .......... *H04B 17/12* (2015.01); *H04B 7/0452* (2013.01); *H04B 7/0617* (2013.01);
(Continued)

(58) Field of Classification Search
CPC .... H04B 17/12; H04B 7/0452; H04B 7/0617; H04L 5/0051; H04L 43/06; H04W 8/24;
(Continued)

(56) References Cited

U.S. PATENT DOCUMENTS

2016/0014706 A1* 1/2016 Vajapeyam ......... H04W 56/001
370/328
2018/0019899 A1* 1/2018 Kuchi .................... H04B 7/022
(Continued)

FOREIGN PATENT DOCUMENTS

WO WO-2020182295 A1 * 9/2020 ........... H04B 7/0408

OTHER PUBLICATIONS

Intel Corporation: "Discussion on Beam Management", 3GPP TSG-RAN WG1 Meeting NR#3, 3GPP Draft, R1-1716294, Discussion on Beam Management, 3rd Generation Partnership Project (3GPP), Mobile Competence Centre, 650, Route Des Lucioles, F-06921 Sophia-Antipolis Cedex, France, RAN WG1, No. Nagoya, Japan, Sep. 18, 2017-Sep. 21, 2017, Sep. 17, 2017 (Sep. 17, 2017), pp. 1-3, XP051339750, Retrieved from the Internet: URL: http://www.3gpp.org/ftp/Meetings_3GPP_SYNC/RAN1/Docs/ [retrieved on Sep. 17, 2017], Section 4.2, Section 3.
(Continued)

*Primary Examiner* — Ian N Moore
*Assistant Examiner* — Latresa A McCallum
(74) *Attorney, Agent, or Firm* — ArentFox Schiff LLP

(57) ABSTRACT

A base station may perform online calibration of antenna elements at two or more transmission reception points (TRPs) based on measurements by one or more user equipment (UEs). The base station may transmit a request for the one or more UEs to perform antenna calibration measurements, for the two or more TRPs, during measurement gaps. The base station may coordinate, among the two or more TRPs, transmission of reference signals during the measurement gaps. The base station may receive a report based on the antenna calibration measurements from the one or more UEs. The base station may calibrate one or more antenna elements of the two or more TRPs based on the antenna calibration measurements.

28 Claims, 12 Drawing Sheets

(51) Int. Cl.
*H04L 5/00* (2006.01)
*H04B 7/06* (2006.01)
*H04W 52/36* (2009.01)
*H04B 7/0452* (2017.01)
*H04W 8/24* (2009.01)

(52) U.S. Cl.
CPC ............. *H04L 5/0051* (2013.01); *H04W 8/24* (2013.01); *H04W 24/10* (2013.01); *H04W 52/367* (2013.01)

(58) Field of Classification Search
CPC ... H04W 24/10; H04W 52/367; H04W 8/005; H04W 24/02; H04W 36/00; H04W 36/0083; H04W 36/0088; H04W 40/24; H04W 52/365; H04W 72/08; H04M 1/72406
See application file for complete search history.

(56) References Cited

U.S. PATENT DOCUMENTS

| | | | |
|---|---|---|---|
| 2018/0255472 A1* | 9/2018 | Chendamarai Kannan | H04W 76/10 |
| 2018/0368152 A1* | 12/2018 | Lin | H04B 7/0695 |
| 2019/0098601 A1* | 3/2019 | Kumar | H04W 48/16 |
| 2019/0182900 A1* | 6/2019 | Cui | H04W 56/001 |
| 2019/0222326 A1* | 7/2019 | Dunworth | H04B 1/04 |
| 2019/0273637 A1* | 9/2019 | Zhang | H04W 80/02 |
| 2020/0107327 A1 | 4/2020 | Wang et al. | |
| 2020/0280425 A1* | 9/2020 | Wu | H04L 5/0048 |
| 2020/0336194 A1* | 10/2020 | Karjalainen | H04W 24/10 |
| 2020/0351814 A1* | 11/2020 | Manolakos | H04L 5/001 |

OTHER PUBLICATIONS

International Search Report and Written Opinion—PCT/US2021/034966—ISA/EPO—dated Sep. 17, 2021.

* cited by examiner

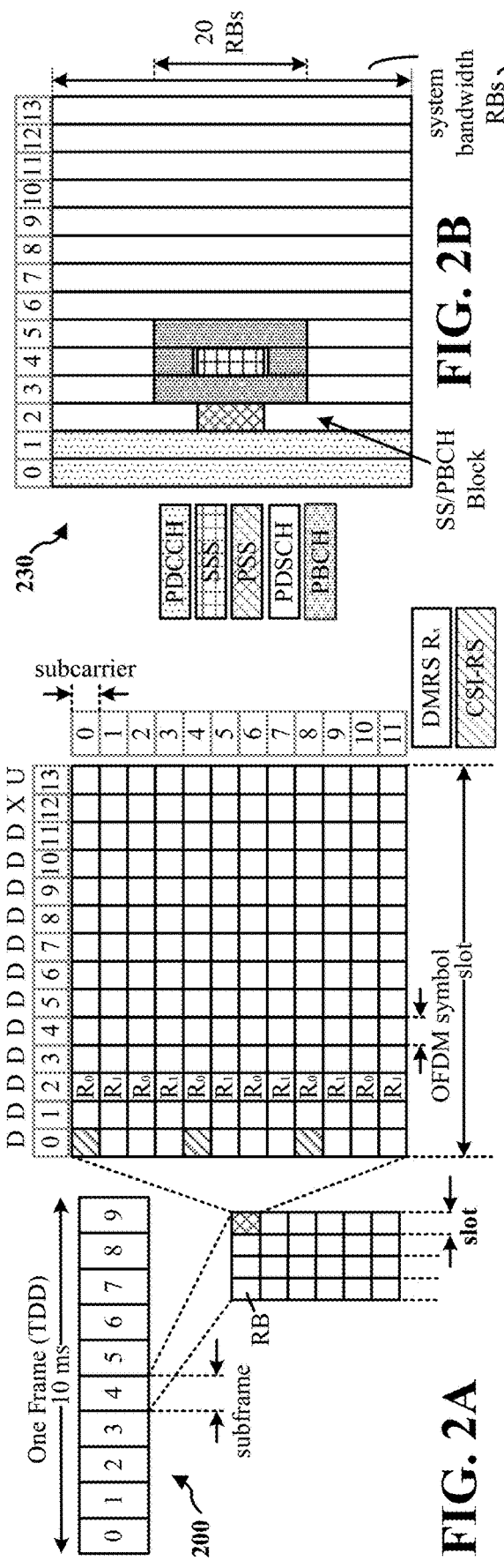
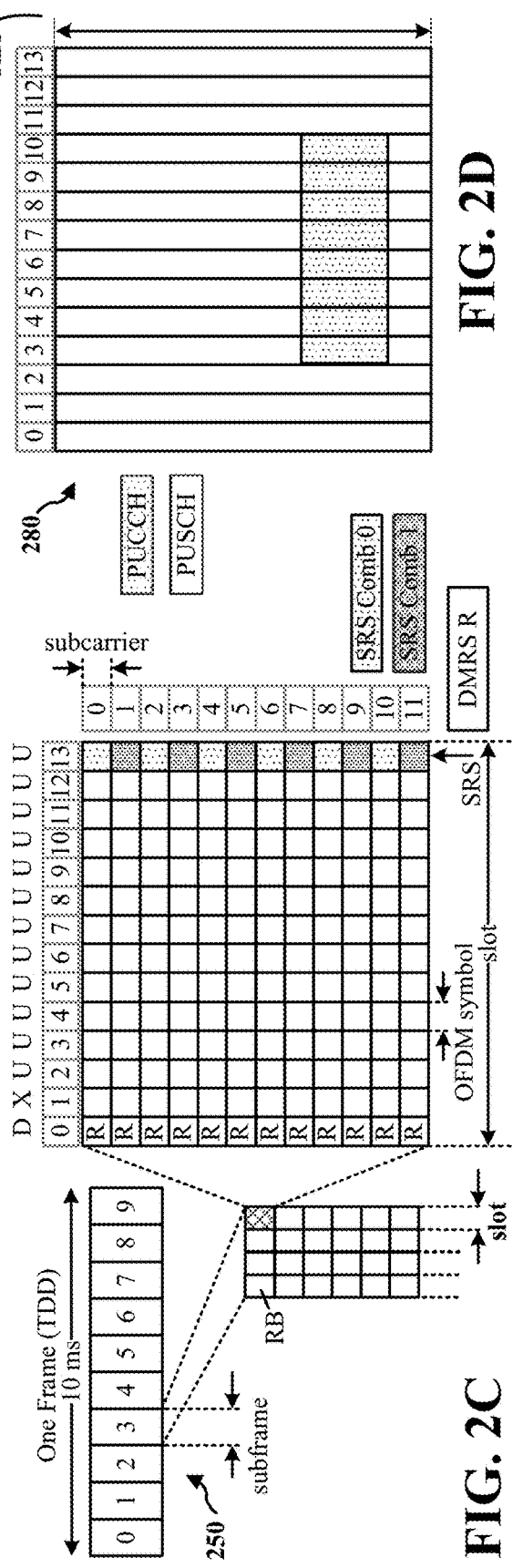
FIG. 2A  FIG. 2B  FIG. 2C  FIG. 2D

MEASUREMENT GAP CONFIGURATION FOR MULTI-TRP ANTENNA CALIBRATION

CROSS REFERENCE TO RELATED APPLICATIONS

This application claims priority to U.S. Provisional Application No. 63/044,644 titled "MEASUREMENT GAP CONFIGURATION FOR MULTI-TRP ANTENNA CALIBRATION," filed Jun. 26, 2020, which is assigned to the assignee hereof, and incorporated herein by reference in its entirety.

BACKGROUND

Technical Field

The present disclosure relates generally to communication systems, and more particularly, to online antenna calibration using configured measurement gaps for multiple transmission-reception points (TRPs).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a base station to perform online antenna calibration. The method may include transmitting a request for one or more user equipment (UEs) to perform antenna calibration measurements, for two or more transmission reception points (TRPs), during measurement gaps. The method may include coordinating, among the two or more TRPs, transmission of reference signals during the measurement gaps. The method may include receiving a report based on the antenna calibration measurements from the one or more UEs. The method may include calibrating one or more antenna elements of the two or more TRPs based on the antenna calibration measurements.

In some implementations, the method may further include selecting the one or more UEs based on at least one of: capabilities of the one or more UEs, power or thermal overheads of the one or more UEs, a data rate requirement of the one or more UEs, or a reliability requirement of the one or more UEs.

In some implementations, the request configures the measurement gaps for making the antenna calibration measurements. A number and periodicity of the measurement gaps may be based on at least one of: a number of panels at the two or more TRPs, antenna array geometry and size of the panels at the two or more TRPs, a maximum transmit power level at the two or more TRPs, existing antenna calibration inaccuracies at the two or more TRPs, a number of layers from each TRP, required array gains in downlink at the UE or in uplink at the two or more TRPs, or steering angle of a beam in a beamformed transmission at the two or more TRPs. A number and periodicity of the measurement gaps may be based on thermal overheads associated with each TRP.

In some implementations, the method further includes communicating the received report to another of the two or more TRPs via a backhaul network.

In some implementations, the request includes a joint quasi-co-location (QCL) mapping for reception of transmissions from the TRPs to the one or more UEs.

In some implementations, the report includes a measurement with a fixed receive beam for transmissions from at least one of the two or more TRPs and different receive beams for transmissions from at least another of the two or more TRPs.

In some implementations, coordinating, among the two or more TRPs, the transmission of the reference signals during the measurement gaps includes performing multi-user multiple-input, multiple-output (MU-MIMO) transmissions to multiple UEs.

The disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

In an aspect, the disclosure provides a method of wireless communication for a UE to assist online antenna calibration for two or more TRPs. The method may include receiving a request to perform antenna calibration measurements during measurement gaps, for two or more TRPs. The method may include performing the antenna calibration measurements on reference signals from the two or more TRPs during the measurement gaps. The method may include transmitting a report to at least one of the TRPs based on the antenna calibration measurements.

In some implementations, performing the antenna calibration measurements includes performing measurements with a fixed receive beam for transmissions from at least one of the two or more TRPs and different receive beams for transmissions from at least another of the two or more TRPs.

In some implementations, the request includes a joint QCL mapping for reception of transmissions from the two or more TRPs to the UE.

In some implementations, performing the antenna calibration measurements comprises performing measurements of MU-MIMO transmissions with different receive beams to measure an impact of side lobes or beam nulls.

The disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

In an aspect, the disclosure provides a method of wireless communication for a UE to perform online antenna calibration. The method may include transmitting a request for the UE to transmit reference signals to two or more transmission-reception points (TRPs) during measurement gaps for antenna calibration measurements. The method may include transmitting the reference signals to the two or more TRPs during the measurement gaps. The method may include receiving a report based on the antenna calibration measurements from the two or more TRPs. The method may include calibrating one or more antenna elements of the UE based on the antenna calibration measurements.

In some implementations, the TRPs configure the measurement gaps in response to the request.

The disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with certain aspects of the present description.

FIG. 2B is a diagram illustrating an example of DL channels within a subframe, in accordance with certain aspects of the present description.

FIG. 2C is a diagram illustrating an example of a second frame, in accordance with certain aspects of the present description.

FIG. 2D is a diagram illustrating an example of a subframe, in accordance with certain aspects of the present description.

DETAILED DESCRIPTION

Figure 1:
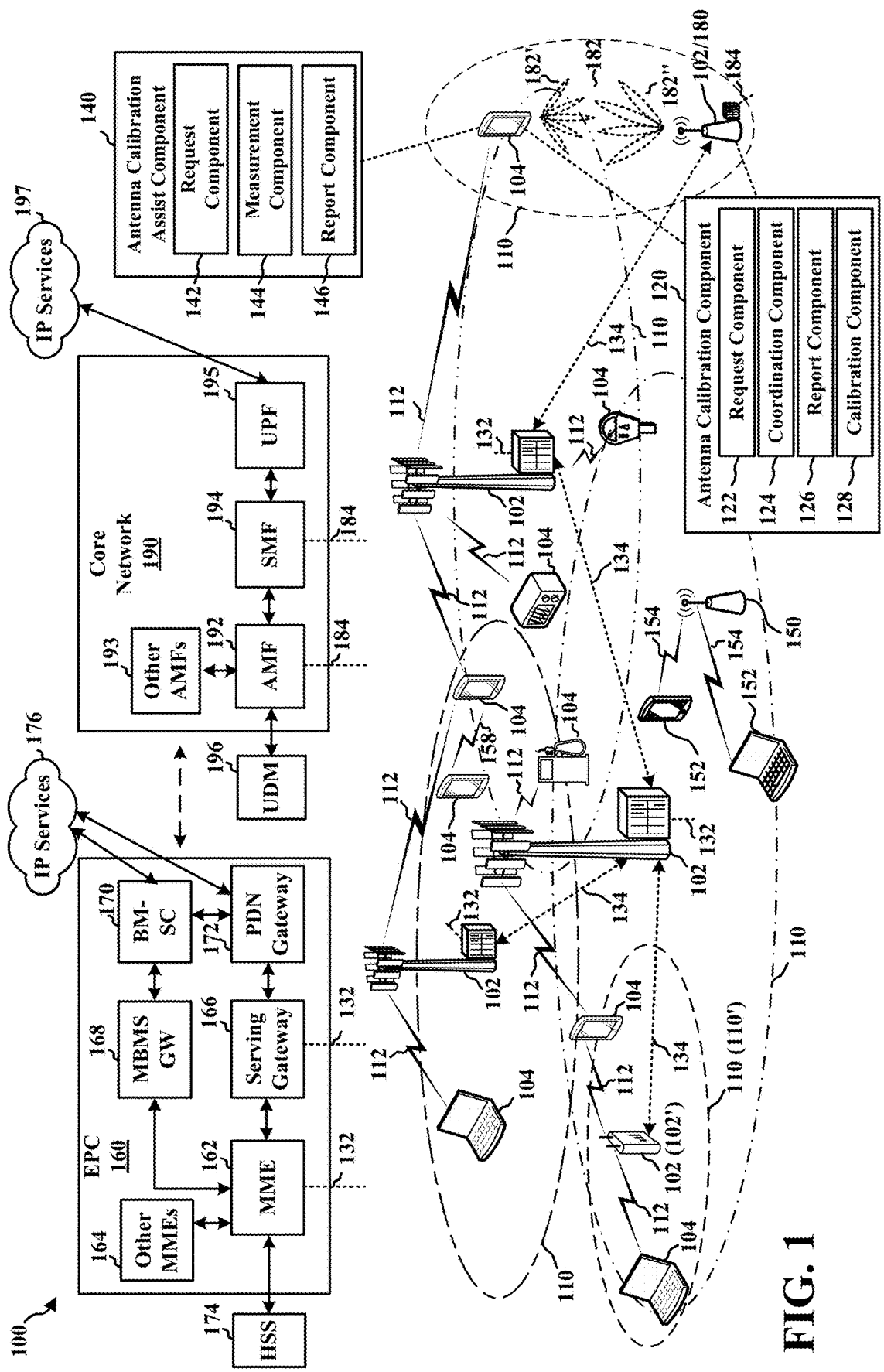
FIG. 1 is a diagram illustrating an example of a wireless communications system and an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

For mmWave communications, beamforming may be used to coherently combine energy and overcome high path losses observed at higher frequencies. Beamforming weights may be computed for signaling. For example, beamforming weights can be computed at applied at the UE antennas in the receive (Rx) mode. The same weights cannot be reused for transmission from the UE antennas since the RF pathway/circuitry is different (e.g., different set of amplifiers, mixers, couplers, filters, etc., in Tx and Rx modes). This mismatch can be compensated with a procedure known as antenna calibration. Accurate phase and amplitude calibration at an antenna element is a function of temperature and carrier frequency. The cost of implementing calibration can increase as more antenna elements are used. Typically, a low-complexity calibration is an offline/one-time exercise with a certain error between true and recorded phase and amplitude. In many scenarios, the error could be large (e.g., 10°-25° in phase). Accordingly, improved techniques for antenna calibration may be beneficial.

In an aspect, the present disclosure provides techniques for network-assisted calibration of antennas in a multi-TRP beamforming scenario. For example, the TRPs may perform an online calibration of antenna elements of one or more TRPs while the TRPs are being used for communication based on measurements performed by one or more UEs with which the TRPs are in communication. For instance, one or more base stations may transmit a request for one or more UEs to perform antenna calibration measurements during measurement gaps. The base station may select the UEs based on capabilities of the UEs and impact on the performance of the UEs. During the measurement gaps, the one or more base stations may coordinate, among two or more TRPs, transmission of reference signals. The one or more UEs may perform the antenna calibration measurements using different receive beams. The one or more UEs may transmit a report based on the antenna calibration measurements. The base station may calibrate one or more antenna elements of the two or more TRPs based on the antenna calibration measurements. The base station may communicate the report with another base station or TRP via a backhaul network.

In some wireless communications systems, measurement gaps may be provided as a time duration over which a UE suspends signaling to a serving cell (PCell) in order to measure a neighbor cell (inter-frequency or inter-RAT). For instance, in NR, both per-UE and per-frequency range (FR) measurement gaps can be configured. Different measurement gap pattern configurations (e.g., measurement gap length and measurement gap repetition period) may be used. Such measurement gaps may be used for measuring beams of neighbor cells for the sake of cell/beam handover, adding another component carrier in carrier aggregation, etc. Measurement gaps may be used to make measurements of appropriate synchronization signal blocks (SSBs) instead of monitoring all SSBs (saving power). In some systems, a higher layer parameter may define a SSB Measurement Timing Configuration (SMTC) window. Although such configuration options allow a UE to determine relative signal strength of cells and select beams, further coordination may be needed for network-assisted calibration measurements in a multi-TRP scenario. In particular, existing configurations may be offered at a periodicity that may not be sufficient for good beamforming performance and thus improved network-assisted calibration opportunities may be desirable.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, as illustrated, one or more of the base stations 102 may include an antenna calibration component 120 that configures a UE to perform antenna calibration measurements and performs antenna calibration based on the antenna calibration measurements. The antenna calibration component 120 may include a request component 122 configured to transmit a request for one or more UEs 104 to perform antenna calibration measurements, for two or more TRPs, during measurement gaps. The antenna calibration component 120 may include a coordination component 124 configured to coordinate, among the two or more TRPs, transmission of reference signals during the measurement gaps. The antenna calibration component 120 may include a report component 126 configured to receive a report based on the antenna calibration measurements from the one or more UEs. The antenna calibration component 120 may include a calibration component 128 configured to calibrate one or more antenna elements of the two or more TRPs based on the antenna calibration measurements.

In an aspect, as illustrated, one or more of the UEs 104 may include an antenna calibration assist component 140 that generates an antenna calibration measurement report that can be used by two or more TRPs to calibrate antenna elements. The calibration assist component 140 may include a request component 142 configured to receive a request to perform antenna calibration measurements during measurement gaps, for two or more TRPs. The calibration assist component 140 may include a measurement component 144 configured to perform the antenna calibration measurements on reference signals from the two or more TRPs during the measurement gaps. The calibration assist component 140 may include a report component 146 configured to transmit a report to at least one of the TRPs based on the antenna calibration measurements. In some implementations, one or more of the UEs 104 may include an antenna calibration component 120 for performing antenna calibration with the assistance of two or more TRPs.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmission reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu$ *15 kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
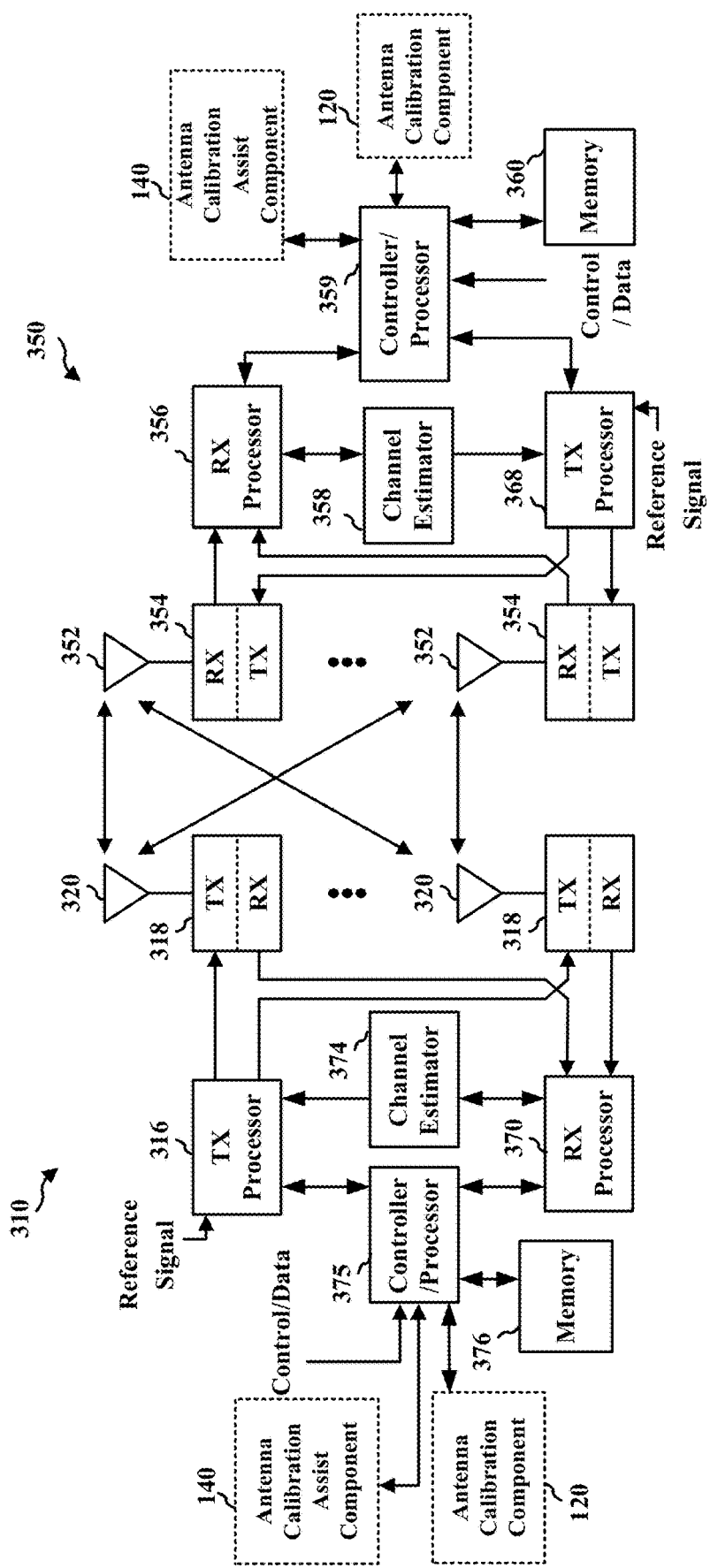
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the antenna calibration assist component 140 of FIG. 1. Further, in some implementations, the UE 350 may include an antenna calibration component 120 and at least one of the TX processor 368, the RX processor 356, and the controller/processor 359 may be configured to perform aspects in connection with the antenna calibration component 120 of FIG. 1.

At least one of the TX processor 316, the RX processor 370, and the controller/processor 375 may be configured to perform aspects in connection with the antenna calibration component 120 of FIG. 1. Further, in some implementations, the base station 310 may include an antenna calibration assist component 140 and at least one of the TX processor 316, the RX processor 370, and the controller/processor 375 may be configured to perform aspects in connection with the antenna calibration assist component 140 of FIG. 1.

Figure 4:
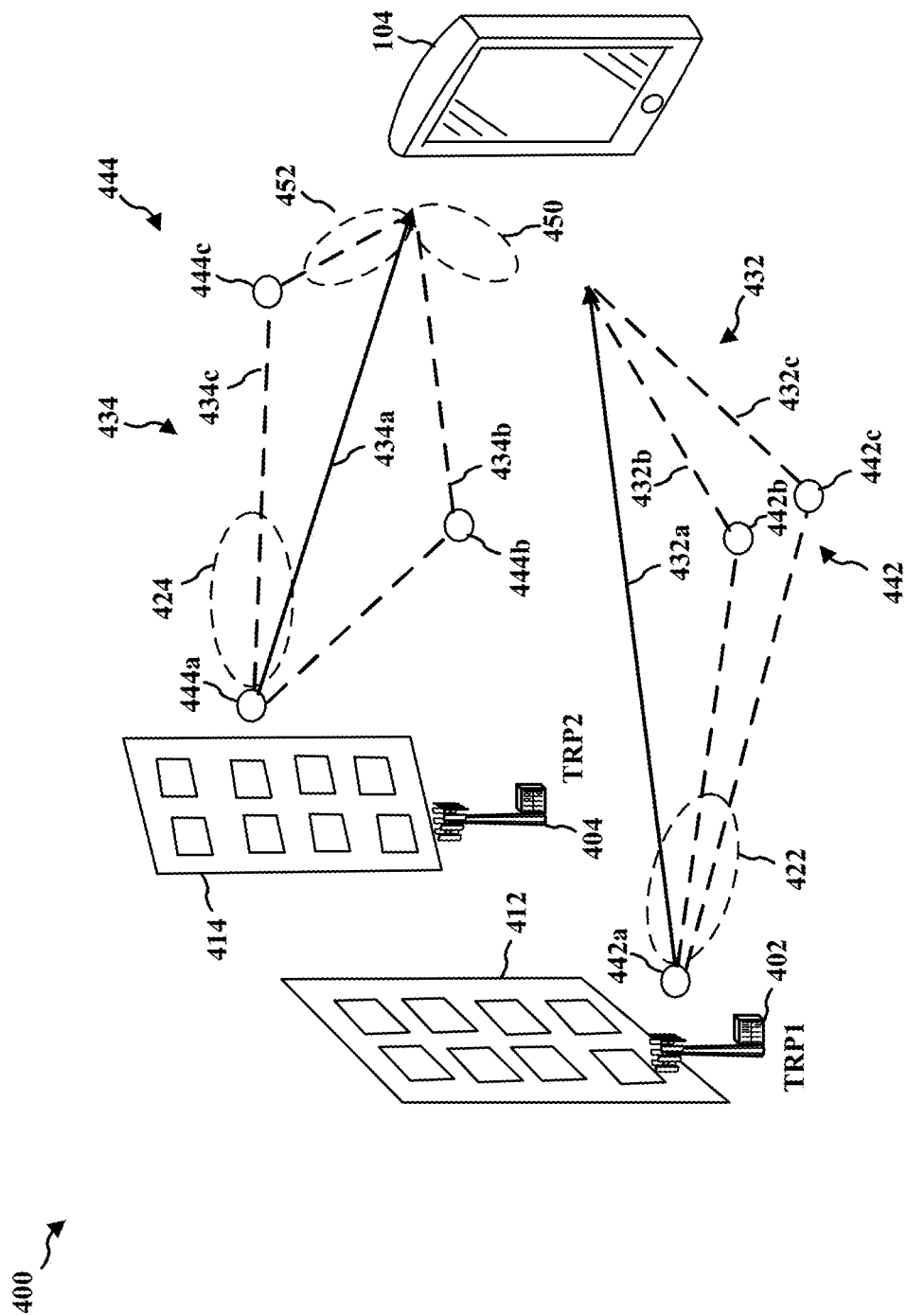
FIG. 4 is a diagram illustrating an example of a downlink transmission with multiple transmission-reception points (TRPs), in accordance with certain aspects of the present description.

FIG. 4 is a diagram illustrating example downlink transmission with multiple TRPs. For example, a first base station 402 may be associated with a first TRP (TRP1) 412 and a second base station 404 may be associated with a second TRP (TRP2) 414. Each TRP may transmit a respective beam 422, 424. The beams 422, 424 may be the result of different antenna configurations at the base stations 402, 404, or the TRPs 412, 414, which may typically include a large antenna array for beam steering. In an aspect, a channel may include multiple paths 432, 434 (e.g., paths 432a-432c and 434a-434c) between the TRPs 412, 414 and the UE 104. For instance, a direct path 432a, 434a may exist if there is a line of sight between one of the TRPs 412, 414 and the UE 104. An RF signal may also follow an indirect path. For example, the signal may reflect off an object such as a building, vehicle, or window. From the perspective of the UE 104, the signal may appear to arrive from a cluster 442, 444. A cluster (e.g., clusters 442, 444) may be a reflected or a diffracted source of a signal that arrives at the UE 104. For example, a cluster 442a may correspond to the TRP 414 and a cluster 444a may correspond to the TRP2 414. The clusters 442b, 442c, 444b, and 444c may correspond to objects that reflect the signals in the indirect paths 432b, 432c, 434b, and 434c, respectively.

The UE 104 may have an active antenna configuration that generates a receive beam 450, 452. The UE 104 may control antenna weights to steer the receive beam 450, 452 towards one or more cluster 442, 444. A strongest cluster may be referred to as a dominant cluster and other clusters may be referred to as sub-dominant clusters. The UE 104 may dynamically change an active antenna configuration to focus on one or more clusters. For example, the UE 104 may use the active antenna configuration that generates the receive beam 450 when the cluster 442a is the dominant cluster. The UE 104 may change the active antenna configuration to generate the receive beam 452 when the cluster 444a.

In an aspect, a base station may determine to jointly beamform a transmission from TRP1 and TRP2 to a single UE 104 based on a joint quasi-co-location (QCL) mapping. For example, the UE 104 may be experiencing poor channel conditions and joint beamforming may provide a sufficiently strong signal to achieve a desired data rate. However, precise/high gain beamforming to the UE 104 may not be possible due to calibration errors/inaccuracies at the TRP1 and TRP 2. For example, some of these errors could be time-varying and may not be estimated via offline procedures. According to the present disclosure, TRP1 and TRP2 may cooperatively activate a network-assisted antenna calibration procedure. For UE-assisted TRP calibration, at least two TRPs can request one or more UEs to assist the TRPs by making measurements during measurement gaps and reporting the measurements to the at least two TRPs.

A number of parameters can be configured for network-assisted antenna calibration. In general, more measurements at any UE results in greater power consumption and thermal overhead that does not contribute to communicating UE data. Accordingly, measurements may be associated with lower performance (e.g., lower data rate, higher error probability, or higher latency). The TRPs could coordinate the usage of measurement gaps across multiple UEs in the network. The UEs selected to assist the TRPs could be dependent on capabilities of each UE (e.g., ability to assist, which may be determined by an independent bit field), thermal/power overhead, rate/reliability requirements, etc.

A number of measurement gaps for antenna calibration may be configured for a UE by each TRP and the periodicity of the measurement gaps may be determined by capabilities of each TRP. Example capabilities of a TRP include: a number of panels, antenna array geometry and size of the panels, a maximum transmit power level, existing antenna calibration inaccuracies, a number of layers from the TRP, required array gains in downlink at the UE or in uplink at the TRP, or steering angle of a beam in a beamformed transmission the TRP. For example, a larger array may consume more resources for measurements. A greater maximum transmit power level may provide greater gains and consume greater resources. Existing antenna calibration inaccuracies may require more measurement resources. A larger number of layers from a TRP may require more resources. More of the required array gains may require more resources. For steering angle, the closer the steering angle is to a boresight of the antenna array, the more resources may be needed for refinement. Additionally, although power consumption is generally not a major concern for a base station, thermal overheads may impose limits. Thus, more resources may be offered by a TRP with a lower thermal overhead (which may not need good calibration) and communicated to a TRP with the need for better calibration (e.g., due to higher thermal overhead) via a backhaul.

Figure 5:
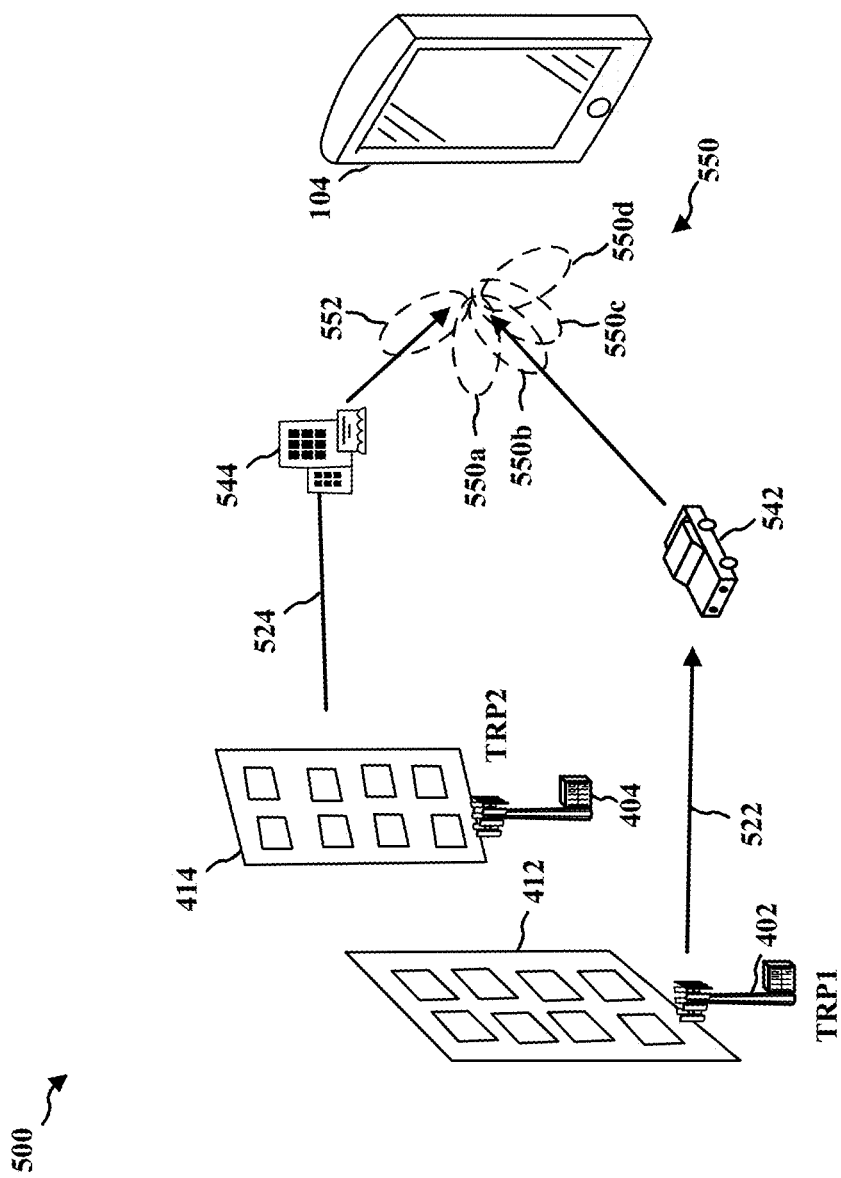
FIG. 5 is a diagram illustrating example measurement of reference signals in a downlink transmission with multiple TRPs, in accordance with certain aspects of the present description.

FIG. 5 is a diagram 500 illustrating example measurement of reference signals in a downlink transmission with multiple TRPs. The TRPs may utilize a joint quasi-co-location (QCL) mapping for calibration. For example, the TRPs may select beams 522, 524 based on the joint QCL mapping. The TRPs may transmit a reference signal based on the QCL jointly from both TRP1 412 and TRP2 414 during the measurement gaps so that UE 104 can make measurements. For instance, the beam 522 may reflect off a vehicle 542 and the beam 524 may reflect off a building 544. The UE 104 may fix an Rx beam 552 receiving from TRP2 414 as the UE 104 tries out different Rx beams 550 (e.g., beams 550a, 550b, 550c, and 550d) for receiving from TRP1 to measure or identify potential side lobes. The UE 104 may report measurements (e.g., phase and amplitude) associated with each of the different Rx beams 550.

Figure 6:
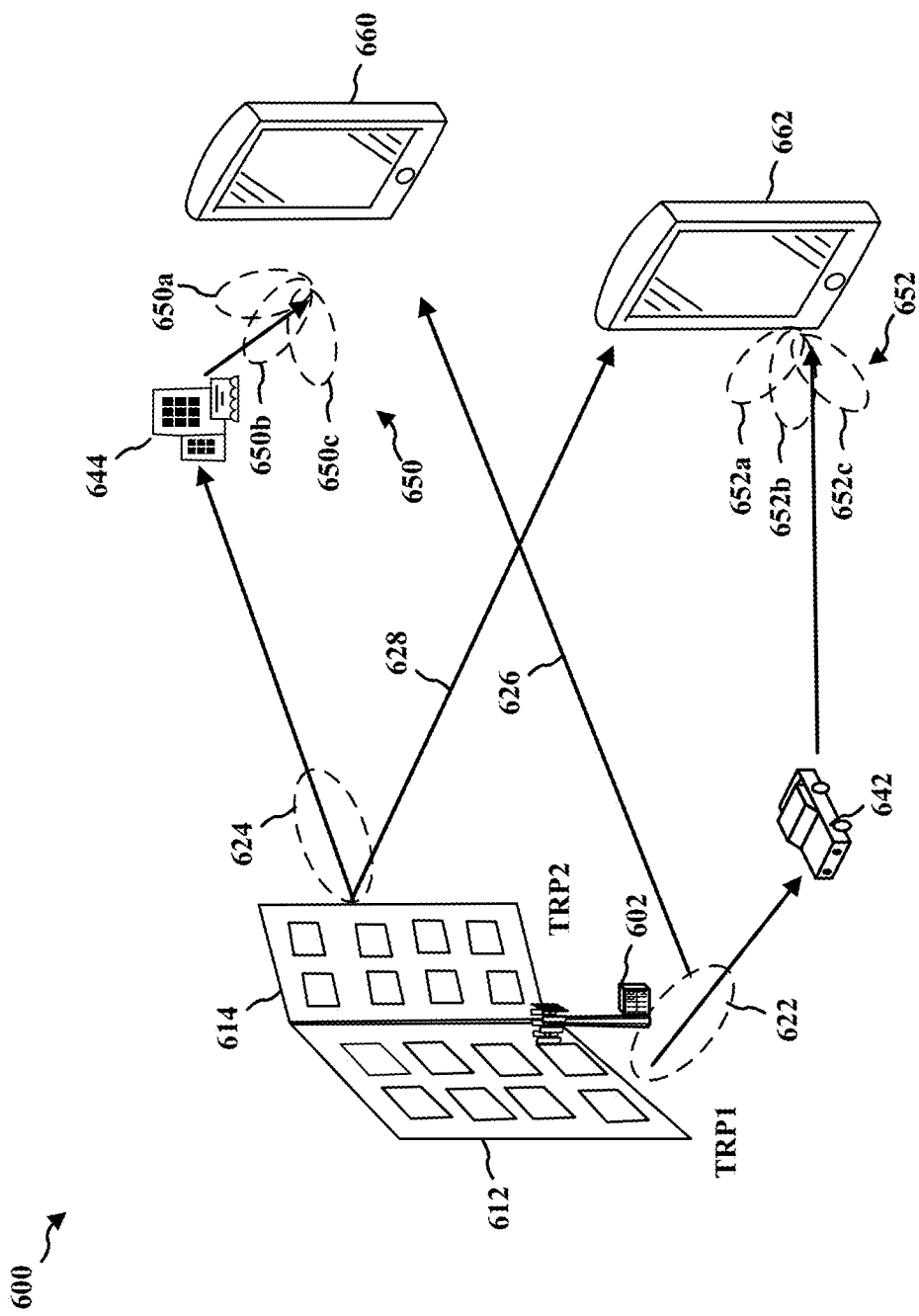
FIG. 6 is a diagram illustrating examples of measurements by multiple UEs in a downlink transmission with multiple TRPs, in accordance with certain aspects of the present description.

FIG. 6 is a diagram 600 illustrating example measurement by multiple UEs 660, 662 in a downlink transmission with multiple TRPs 612, 614. For example, the multiple TRPs 612, 614 may be provided by a single base station 602. The TRPs may utilize a QCL mapping jointly signaled from both TRPs so that all UEs 660, 662 can make measurements during measurement gaps. The TRPs 612, 614 may perform MU-MIMO to multiple UEs 660, 662. For instance, the TRP1 612 may generate a beam 622 and the TRP2 614 may generate a beam 624. The beam 622 may reflect off a vehicle 642 to reach the UE2 662. The beam 624 may reflect off the building 644 to reach the UE1 660. Each UE 660, 662 may try different Rx beams 650, 652 to measure impact of side lobes from other TRPs. There may be no need to restrict the Rx beam of some UEs to be fixed. For example, the UE1 660 may try Rx beams 650a, 650b, 650c to detect the sidelobe 626 and the UE2 may try beams 652a, 652b, and 652c to detect sidelobe 628.

Figure 7:
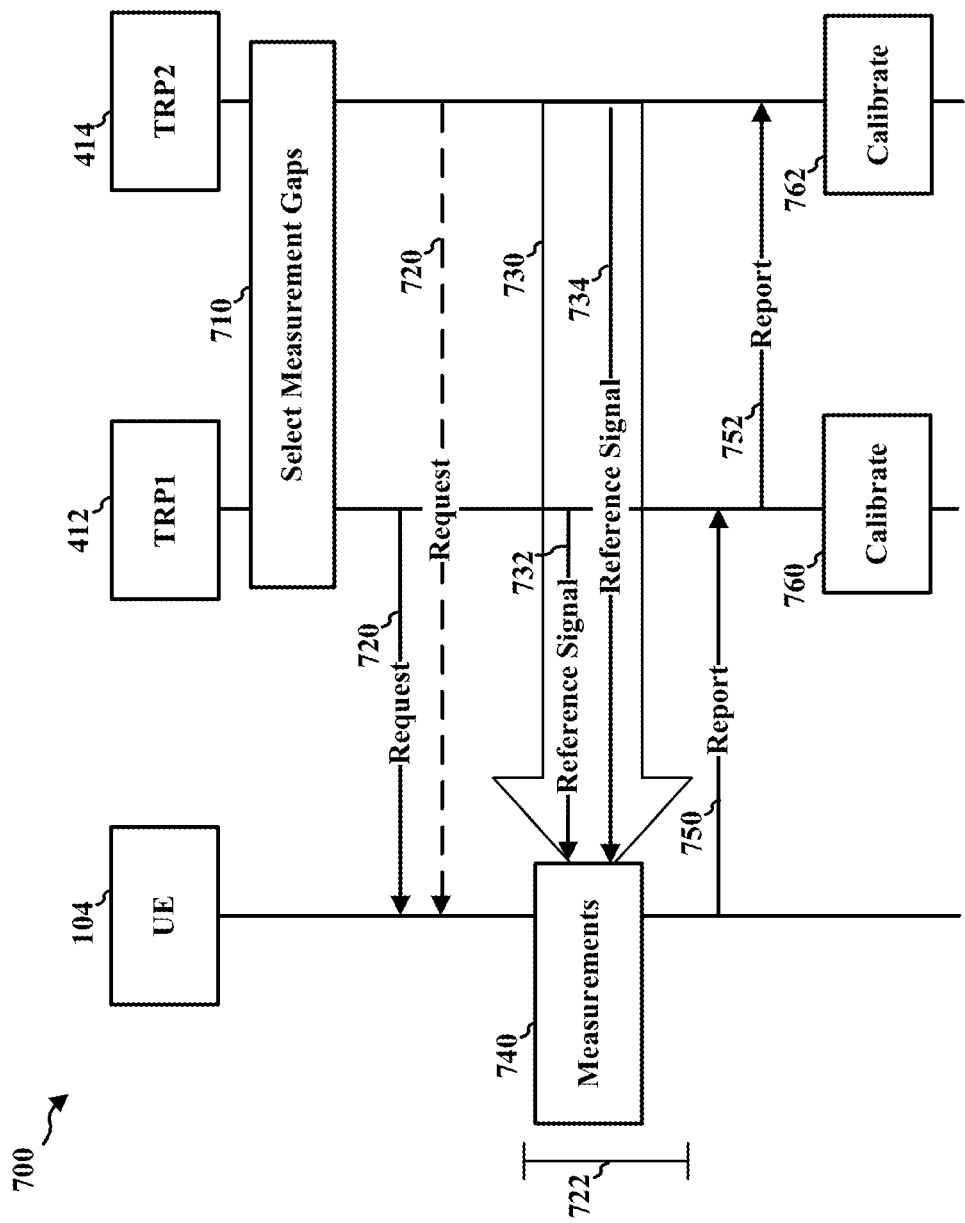
FIG. 7 is a diagram illustrating example communications and processes of an example base station and a UE, in accordance with certain aspects of the present description.

FIG. 7 is a diagram 700 illustrating example communications and processes of example TRPs 412, 414 and a UE 104. The TRPs 412, 414 may be provided by separate base stations 402, 404, as illustrated in FIG. 5, or may be provided by a single base station 602 as illustrated in FIG. 6.

At block 710, one or both of the TRPs 412, 414 may select measurement gaps 722. The measurement gaps 722 may be periods of time when the UE 104 is not scheduled to transmit or receive data. Instead, the UE 104 may perform antenna calibration measurements during the measurement gaps 722. In some implementations, the TRPs 412, 414 may select a number and periodicity of the measurement gaps based on capabilities of the TRPs 412, 414. For instance, a number and periodicity of the measurement gaps are based on at least one of: a number of panels at the two or more TRPs, antenna array geometry and size of the panels at the two or more TRPs, a maximum transmit power level at the two or more TRPs, existing antenna calibration inaccuracies at the two or more TRPs, a number of layers from each TRP, required array gains in downlink at the UE or in uplink at the two or more TRPs, or steering angle of a beam in a beamformed transmission at the two or more TRPs. In some implementations, the number and periodicity of the measurement gaps may be based on thermal overheads associated with each TRP. The TRPs 412, 414 may communicate via a backhaul link to exchange information regarding the TRP capabilities and thermal overheads.

One or more TRPs 412, 414 may transmit a request 720 for one or more UEs 104 to perform antenna calibration measurements during measurement gaps 722. The TRPs 412, 414 may select the one or more UEs based on at least one of: capabilities of the one or more UEs, power or thermal overheads of the one or more UEs, a data rate requirement of the one or more UEs, or a reliability requirement of the one or more UEs.

The request 720 may be a RRC message or a MAC control element (MAC-CE). In an aspect, the request 720 may utilize joint beamforming from the TRPs 412, 414. Alternatively, a single TRP may transmit the request 720. The request 720 may configure the measurement gaps for making the antenna calibration measurements. In some implementations, the request 720 includes a joint QCL mapping for reception of transmissions from the TRPs 412, 414 to the one or more UEs 104.

The two or more TRPs 412, 414 may coordinate joint transmission of reference signals 730 during the measurement gaps. For example, the TRP1 412 may transmit a reference signal 732 and the TRP2 414 may transmit a reference signal 734. The reference signals 730 may be, for example, a channel state information reference signal (CSI- RS). In some implementations, the two or more TRPs 412, 414 may perform multi-user multiple-input, multiple-output (MU-MIMO) transmissions of the reference signals 730 to multiple UEs.

At block 740, the UE 104 may measure the reference signals 730 during the measurement gap 722. The UE 104 may measure a phase and/or amplitude from a subset of antenna elements at the UE side in response to transmissions from another subset of antenna elements at the TRPs 412, 414. In some implementations, the UE 104 may perform the measurements with a fixed receive beam for transmissions from at least one of the two or more TRPs and different receive beams for transmissions from at least another of the two or more TRPs. For example, as illustrated in FIG. 5, the UE 104 may fix the receive beam 552 for the TRP2 414 while trying different receive beams 550a-d for the TRP1 412. In other implementations, for example, as illustrated in FIG. 6, the UE 104 may perform the measurements on MU-MIMO transmissions with different receive beams to measure an impact of side lobes or beam nulls.

The UE 104 may transmit a report 750 including the results of the measurements in block 740. For example, the report 750 may include the measured phase and/or amplitude values. The UE 104 may transmit the report 750 to one or more of the TRPs 412, 414. In an aspect, the UE 104 may transmit to a single TRP1 412. The TRP1 412 may forward the report 750 as a report 752 over a backhaul network (e.g., a backhaul link 134 in FIG. 1).

At block 760, the TRP1 412 may calibrate one or more antenna elements based on the antenna calibration measurements. For example, the TRP1 412 may compare expected phase and/or amplitude values with received phase and/or amplitude values in the report 750. The TRP1 412 may adjust phase and amplitude settings for at least one antenna element of the array, or one or more transmit chain components to reduce difference between the expected values and the received values and thus the efficacy of beamforming. Similarly, in block 762, the TRP2 414 may also calibrate one or more antenna elements based on the antenna calibration measurements in the report 750.

Figure 8:
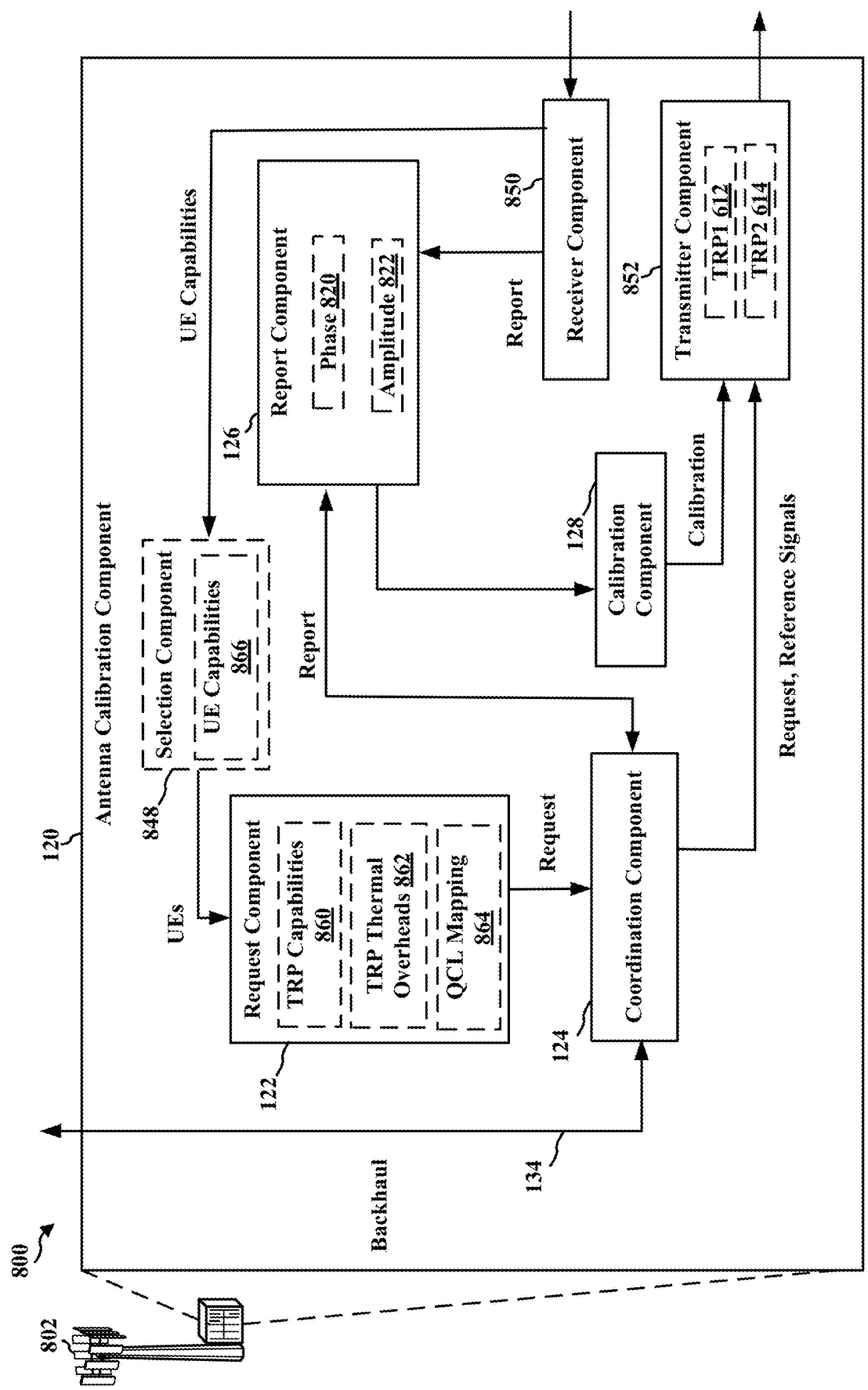
FIG. 8 is a conceptual data flow diagram illustrating the data flow between different means/components in an example base station, in accordance with certain aspects of the present description.

FIG. 8 is a conceptual data flow diagram 800 illustrating the data flow between different means/components in an example base station 802, which may be an example of the base station 102 including the antenna calibration component 120.

As discussed above regarding FIG. 1, the antenna calibration component 120 may include the request component 122, the coordination component 124, the report component 126, and the calibration component 128. The antenna calibration component 120 may also include a receiver component 850 and a transmitter component 852. The receiver component 850 may include, for example, a RF receiver for receiving the signals described herein. The transmitter component 852 may include for example, an RF transmitter for transmitting the signals described herein. In some implementations, the transmitter component 852 may include or may be associated with two or more TRPs. For example, as illustrated in FIG. 6, the base station 602 may include the TRP1 612 and the TRP2 614, both of which may be included in or controlled by the transmitter component 852. In an aspect, the receiver component 850 and the transmitter component 852 may be co-located in a transceiver. In some implementations, the antenna calibration component 120 may include a selection component 848 that is configured to select the one or more UEs to perform antenna calibration measurements.

The request component 122 may generate a request 720 for one or more UEs to perform antenna calibration measurements. The request component 122 may initiate an antenna calibration procedure upon detection of a potential antenna calibration issue. For example, the request component 122 may initiate a calibration procedure in response to a substantial difference (e.g., greater than a threshold) between downlink signal to noise ratio (SNR) and uplink SNR, which may indicate that the lower SNR is due to antenna calibration rather than channel conditions. As another example, if the downlink SNR and the uplink SNR are both poor (e.g., below a threshold) for multiple UEs, the request component 122 may initiate a calibration procedure. The request component 122 may determine measurement gaps 722 for the calibration procedure. A number and periodicity of the measurement gaps 722 may be based on capabilities 860 of the TRPs 412, 414. For example, the request component 122 may determine a number and periodicity of the measurement gaps based on at least one of: a number of panels at the two or more TRPs, antenna array geometry and size of the panels at the two or more TRPs, a maximum transmit power level at the two or more TRPs, existing antenna calibration inaccuracies at the two or more TRPs, a number of layers from each TRP, required array gains in downlink at the UE or in uplink at the two or more TRPs, or steering angle of a beam in a beamformed transmission at the two or more TRPs. In some implementations, the number and periodicity of the measurement gaps may be based on thermal overheads 862 associated with each TRP. In some implementations, the request component 122 may determine a QCL mapping 864 to use for the calibration. The request component 122 may provide the request including the configuration of the measurement gaps and the QCL mapping 864 to the coordination component 124.

In implementations including the selection component 848, the selection component 848 may select UEs to perform the antenna calibration measurements. The selection component 848 may select UEs based on UE capabilities 866. The receiver component 850 may receive configuration messages indicating UE capabilities 866 and provide the UE capabilities 866 to the selection component 848. The selection component 848 may select the UEs based on at least one of: capabilities of the one or more UEs, power or thermal overheads of the one or more UEs, a data rate requirement of the one or more UEs, or a reliability requirement of the one or more UEs. For example, the selection component 848 may select UEs with a capability to perform the calibration measurements that have acceptable thermal overhead and can still meet the data rate requirement and reliability requirement while performing the measurements. The selection component 848 may indicate the selected UEs to the request component 122.

The coordination component 124 may receive the request 720 from the request component 122. The coordination component 124 may transmit the request 720 to the UEs via the transmitter component 852. For example, the coordination component 124 may transmit the request 720 as a MAC-CE or RRC configuration message. In some implementations, the coordination component 124 may coordinate transmission of the request 720 with another base station. For example, the coordination component 124 may send the request 720 to the other base station via the backhaul link 134. The coordination component 124 may also coordinate, among two or more TRPs, transmission of reference signals during the measurement gaps 722. For example, when the base station 802 includes the two or more TRPs, the coordination component 124 may transmit the reference signals via the transmitter component 852, TRP1 612, and TRP2 614. When one or more of the TRPs are located at another base station, the coordination component 124 may indicate the QCL mapping 864 and timing information to the other base station via the backhaul link 134.

The receiver component 850 may receive the report 750 from one or more UEs. The receiver component 850 may provide the report 750 to the report component 126. In some implementations, the report component 126 may receive the report 752 from the backhaul link 134 via the coordination component 124. The report component 126 may forward the report 750 to the other base station via the coordination component 124 and the backhaul link 134 as a report 752. The report component 126 may extract measurements such as phase 820 and amplitude 822 from the report 750 or the report 752. The report component 126 may provide the measurements to the calibration component 128.

The calibration component 128 may compare the received measurements of phase 820 and amplitude 822 with the transmitted phase and amplitude of the reference signals. The calibration component 128 may provide calibration information to the transmitter component 852 to adjust one or more antenna elements of the TRP1 612 and/or the TRP2 614. When another TRP is located at another base station, the other base station may include an antenna calibration component 120 that adjusts the other TRP based on the report 752.

Figure 9:
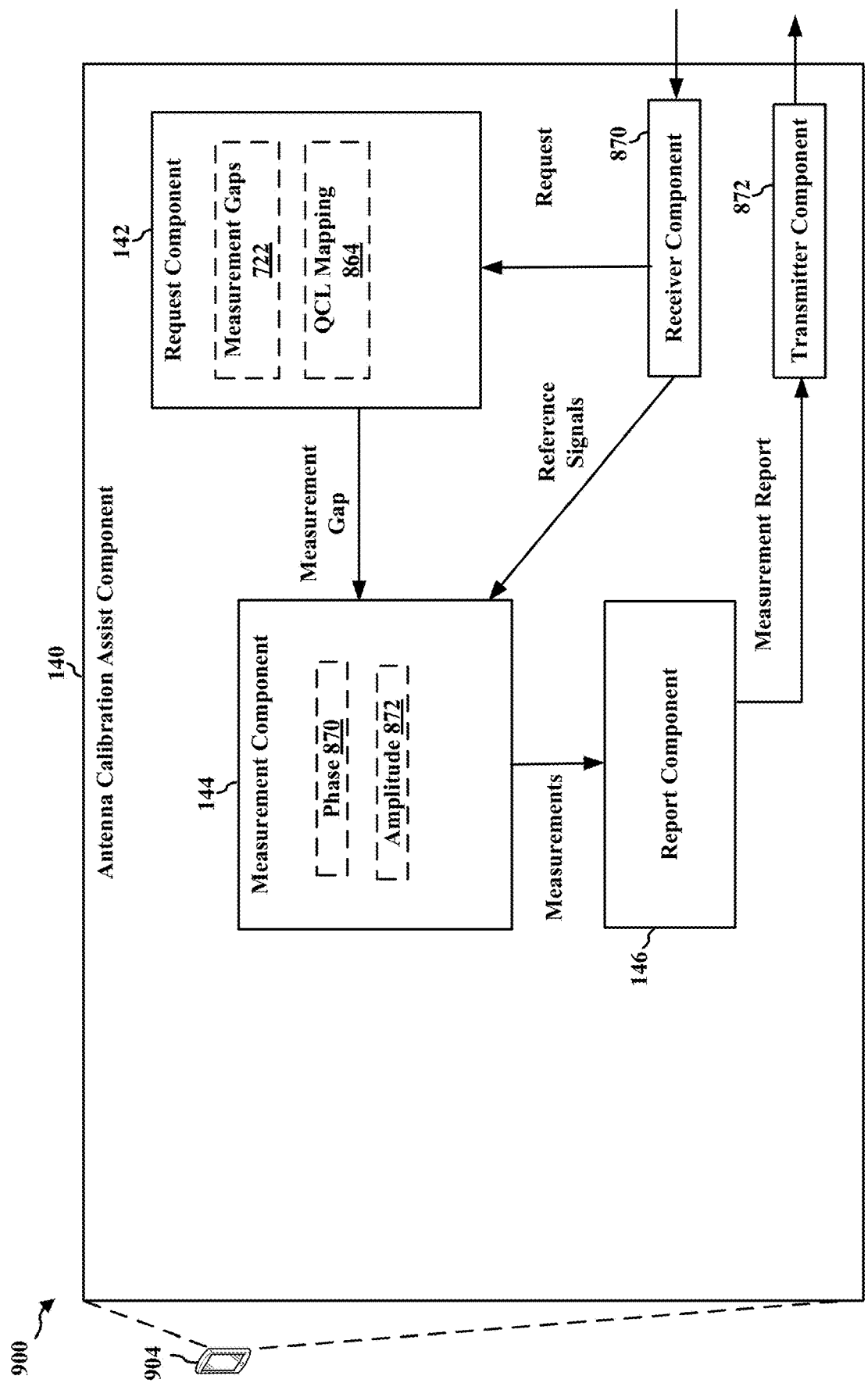
FIG. 9 is a conceptual data flow diagram illustrating the data flow between different means/components in an example UE, in accordance with certain aspects of the present description.

FIG. 9 is a conceptual data flow diagram 900 illustrating the data flow between different means/components in an example UE 904, which may be an example of the UE 104 and include the antenna calibration assist component 140.

As discussed above regarding FIG. 1, the antenna calibration assist component 140 may include the request component 142, the measurement component 144, and the report component 146. The antenna calibration assist component 140 may also include a receiver component 870 and a transmitter component 872. The receiver component 870 may include, for example, a radio-frequency (RF) receiver for receiving the signals described herein. The transmitter component 872 may include for example, an RF transmitter for transmitting the signals described herein. In an aspect, the receiver component 870 and the transmitter component 872 may be co-located in a transceiver.

The receiver component 870 may receive a request 720 from one or more TRPs. The receiver component 870 may provide the request 720 to the request component 142. The receiver component 870 may receive reference signals such as a CSI-RS during the measurement gaps. The receiver component 870 may provide the reference signals to the measurement component 144.

The request component 142 may receive the request 720 from the receiver component 870. The request component 142 may extract a configuration of the measurement gaps 722 and the QCL mapping 864 from the request 720. The request component 142 may provide the configuration of the measurement gaps 722 and the QCL mapping 864 to the measurement component 144.

The measurement component 144 may receive the configuration of the measurement gaps 722 and the QCL mapping 864 from the request component 142. During the measurement gaps, the measurement component 144 may control the receiver component 870 to receive the reference signals 730 according to the QCL mapping 864. The measurement component 144 may receive the reference signals from the receiver component 870. The measurement component 144 may perform antenna calibration measurements on the reference signals. For example, the measurement component 144 may determine measurements of phase 820 and/or amplitude 822. The measurement component 144 may provide the measurements to the report component 146.

The report component 146 may receive the measurements from the measurement component 144. The report component 146 may generate a report 750 including the measurements. The report component 146 may transmit the report 750 to one or more TRPs via the transmitter component 872.

Figure 10:
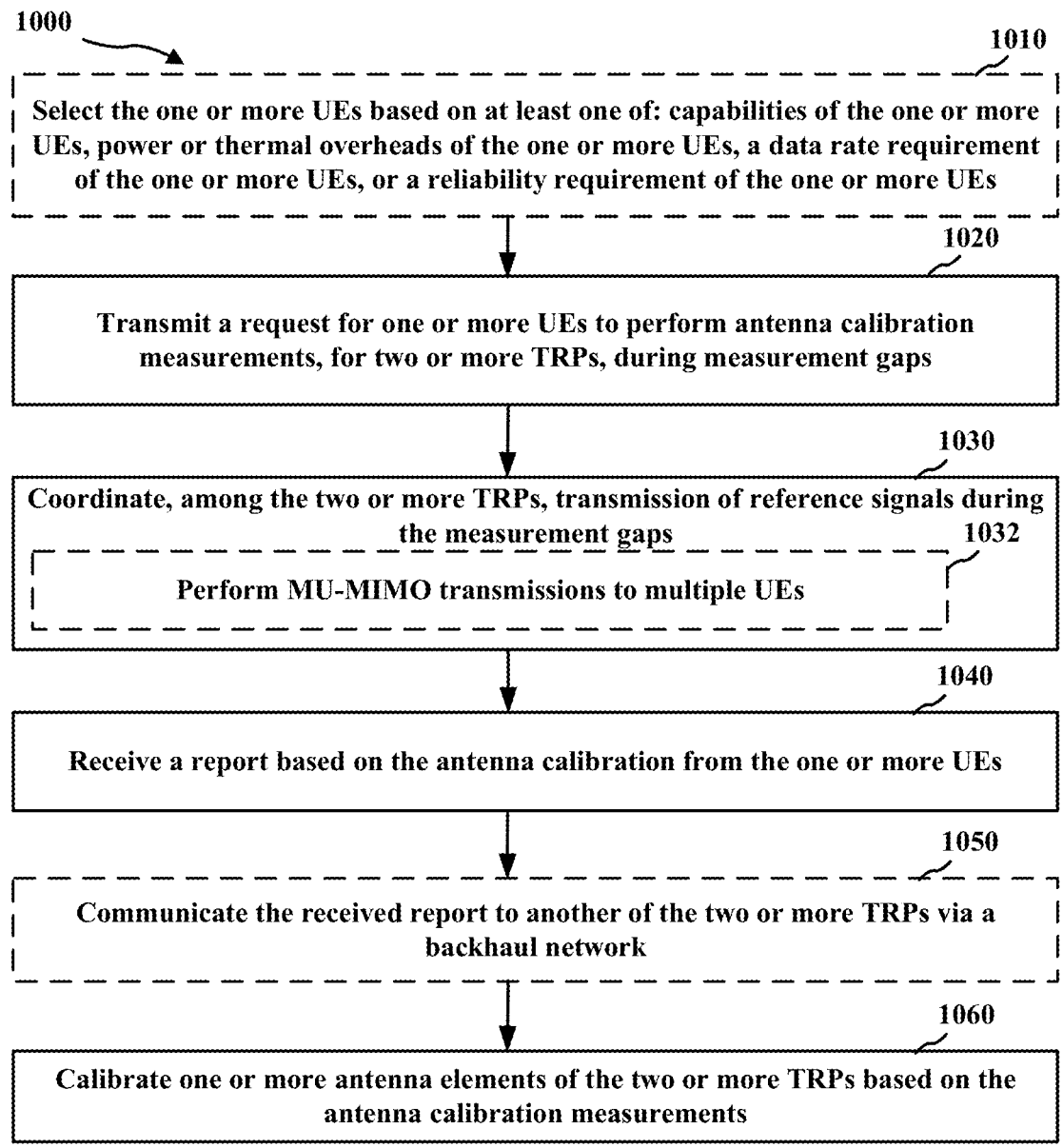
FIG. 10 is a flowchart of an example of a method of wireless communication for a base station to calibrate antennas, in accordance with certain aspects of the present description.

FIG. 10 is a flowchart of an example method 1000 for performing a network calibration procedure for two or more TRPs. The method 1000 may be performed by a base station (such as the base station 102, which may include the memory 376 and which may be the entire base station 102 or a component of the base station 102 such as the antenna calibration component 120, TX processor 316, the RX processor 370, or the controller/processor 375). The method 1000 may be performed by the antenna calibration component 120 in communication with the antenna calibration assist component 140 of the UE 104. The method 1000 may be performed by the antenna calibration component 120 at a first base station in communication with an antenna calibration component 120 at a second base station.

At block 1010, the method 1000 may optionally include selecting one or more UEs based on at least one of: capabilities of the one or more UEs, power or thermal overheads of the one or more UEs, a data rate requirement of the one or more UEs, or a reliability requirement of the one or more UEs. In an aspect, for example, the base station 102, the controller/processor 375, and/or the TX processor 316 may execute the antenna calibration component 120 and/or the selection component 848 to select the one or more UEs based on at least one of: capabilities of the one or more UEs, power or thermal overheads of the one or more UEs, a data rate requirement of the one or more UEs, or a reliability requirement of the one or more UEs. Accordingly, the base station 102, the controller/processor 375, and/or the TX processor 316 executing the antenna calibration component 120 and/or the selection component 848 may provide means for selecting one or more UEs based on at least one of: capabilities of the one or more UEs, power or thermal overheads of the one or more UEs, a data rate requirement of the one or more UEs, or a reliability requirement of the one or more UEs.

At block 1020, the method 1000 may include transmitting a request for one or more UEs to perform antenna calibration measurements, for two or more TRPs, during measurement gaps. In an aspect, for example, the base station 102, the controller/processor 375, and/or the TX processor 316 may execute the antenna calibration component 120 and/or the request component 122 to transmit the request 720 for one or more UEs 104 to perform antenna calibration measurements, for two or more TRPs, during measurement gaps 722. The request 720 may configure the measurement gaps 722 for making the antenna calibration measurements. In some implementations, a number and periodicity of the measurement gaps are based on at least one of: a number of panels at the two or more TRPs, antenna array geometry and size of the panels at the two or more TRPs, a maximum transmit power level at the two or more TRPs, existing antenna calibration inaccuracies at the two or more TRPs, a number of layers from each TRP, required array gains in downlink at the UE or in uplink at the two or more TRPs, or steering angle of a beam in a beamformed transmission at the two or more TRPs. In some implementations, the number and periodicity of the measurement gaps may be based on thermal overheads associated with each TRP. In some implementations, the request includes a joint QCL mapping for reception of transmissions from the TRPs 412, 414 to the one or more UEs 104. Accordingly, the base station 102, the controller/processor 375, and/or the TX processor 316 executing the antenna calibration component 120 and/or the request component 122 may provide means for transmitting a request for one or more UEs to perform antenna calibration measurements, for two or more TRPs, during measurement gaps.

At block 1030, the method 1000 may include coordinating, among the two or more TRPs, transmission of reference signals during the measurement gaps. In an aspect, for example, the base station 102, the controller/processor 375, and/or the TX processor 316 may execute the antenna calibration component 120 and/or the coordination component 124 to coordinate, among the two or more TRPs, transmission of reference signals during the measurement gaps. For example, the coordination component 124 may coordinate the transmission of reference signals according to the QCL mapping 864. For instance, at sub-block 1032, the coordination component 124 may perform MU-MIMO transmissions to multiple UEs (e.g., as illustrated in FIG. 6). Accordingly, the base station 102, the controller/processor 375, and/or the TX processor 316 executing the antenna calibration component 120 and/or the coordination component 124 may provide means for coordinating, among the two or more TRPs, transmission of reference signals during the measurement gaps.

At block 1040, the method 1000 may include receiving a report based on the antenna calibration measurements from the one or more UEs. In an aspect, for example, the base station 102, the controller/processor 375, and/or the TX processor 316 may execute the antenna calibration component 120 and/or the selection component 848 to receive a report 750 based on the antenna calibration measurements from the one or more UEs. The report 750 may include a measurement with a fixed receive beam for transmissions from at least one of the two or more TRPs and different receive beams for transmissions from at least another of the two or more TRPs. Accordingly, the base station 102, the controller/processor 375, and/or the TX processor 316 executing the antenna calibration component 120 and/or the selection component 848 may provide means for receiving a report based on the antenna calibration measurements from the one or more UEs.

At block 1050, the method 1000 may optionally include communicating the received report to another of the two or more TRPs via a backhaul network. In an aspect, for example, the base station 102, the controller/processor 375, and/or the TX processor 316 may execute the antenna calibration component 120 and/or the coordination component 124 to communicate the received report to another of the two or more TRPs via a backhaul network. Accordingly, the base station 102, the controller/processor 375, and/or the TX processor 316 executing the antenna calibration component 120 and/or the coordination component 124 may provide means for communicating the received report to another of the two or more TRPs via a backhaul network.

At block 1060, the method 1000 may include calibrating one or more antenna elements of the two or more TRPs based on the antenna calibration measurements. In an aspect, for example, the base station 102, the controller/processor 375, and/or the TX processor 316 may execute the antenna calibration component 120 and/or the calibration component 128 to calibrate one or more antenna elements of the two or more TRPs based on the antenna calibration measurements. Accordingly, the base station 102, the controller/processor 375, and/or the TX processor 316 executing the antenna calibration component 120 and/or the calibration component 128 may provide means for calibrating one or more antenna elements of the two or more TRPs based on the antenna calibration measurements.

Figure 11:
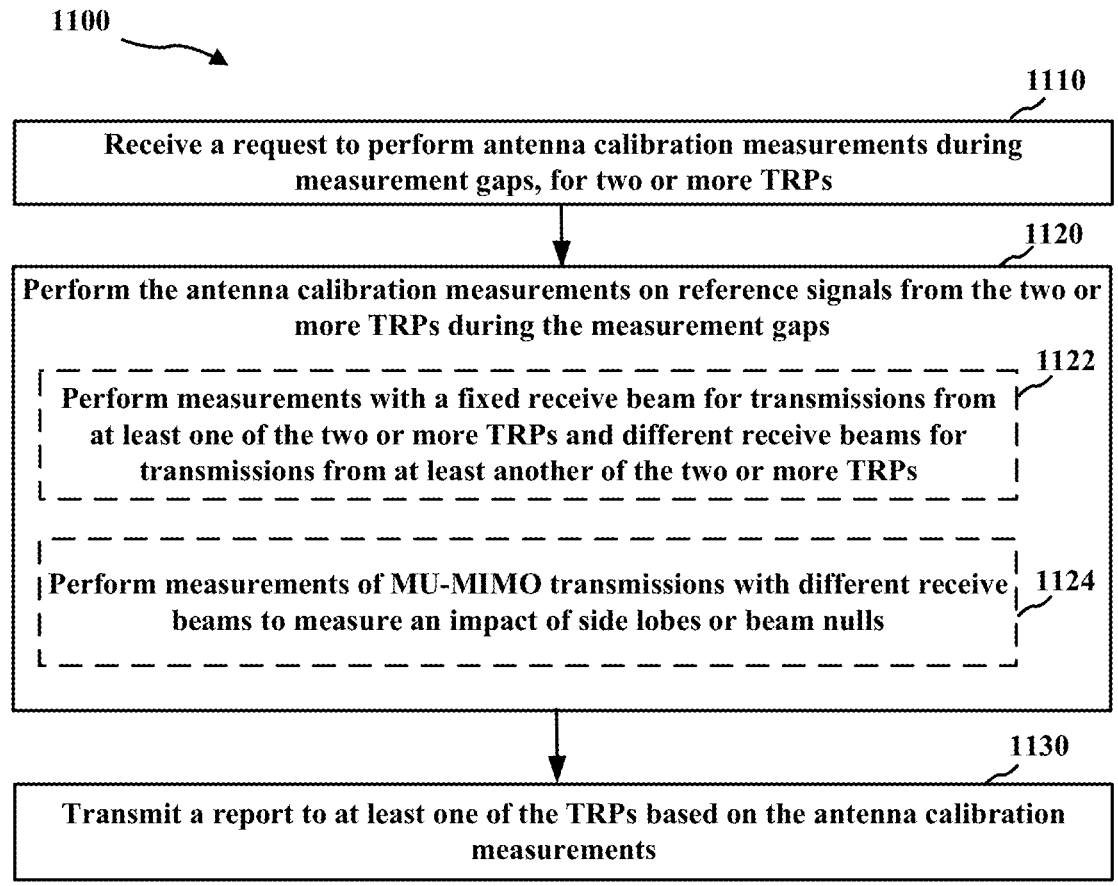
FIG. 11 is a flowchart of an example of a method of wireless communication for a UE to assist with antenna calibration, in accordance with certain aspects of the present description.

FIG. 11 is a flowchart of an example method 1100 for a UE to assist a network calibration procedure for two or more TRPs. The method 1100 may be performed by a UE (such as the UE 104, which may include the memory 360 and which may be the entire UE 104 or a component of the UE 104 such as the antenna calibration assist component 140, TX processor 368, the RX processor 356, or the controller/processor 359). The method 1100 may be performed by the antenna calibration assist component 140 in communication with the antenna calibration component 120 of the base station 102.

At block 1110, the method 1100 may include receiving a request to perform antenna calibration measurements during measurement gaps, for two or more TRPs. In an aspect, for example, the UE 104, the RX processor 356 and/or the controller/processor 359 may execute the antenna calibration assist component 140 and/or the request component 142 to receive the request 720 to perform antenna calibration measurements during measurement gaps 722, for two or more TRPs 412, 414. For example, the request 720 may be a MAC-CE or RRC message indicating resources on which to receive the reference signals 730 and a QCL mapping for receiving the reference signals 730. The UE 104 may suspend signaling with a serving cell during the measurement gaps 722. Accordingly, the UE 104, the RX processor 356, and/or the controller/processor 359 executing the antenna calibration assist component 140 and/or the request component 142 may provide means for receiving a request to perform antenna calibration measurements during measurement gaps, for two or more TRPs.

At block 1120, the method 1100 may include performing the antenna calibration measurements on reference signals from the two or more TRPs during the measurement gaps. In an aspect, for example, the UE 104, the RX processor 356 and/or the controller/processor 359 may execute the antenna calibration assist component 140 and/or the measurement component 144 to perform the antenna calibration measurements on reference signals 730 from the two or more TRPs during the measurement gaps. For example, at sub-block 1122, the measurement component 144 may perform measurements with a fixed receive beam for transmissions from at least one of the two or more TRPs and different receive beams for transmissions from at least another of the two or more TRPs. As another example, at sub-block 1124, the measurement component 144 may perform measurements of MU-MIMO transmissions with different receive beams to measure an impact of side lobes or beam nulls. Accordingly, the UE 104, the RX processor 356, and/or the controller/processor 359 executing the antenna calibration assist component 140 and/or the measurement component 144 may provide means for performing the antenna calibration measurements on reference signals from the two or more TRPs during the measurement gaps.

At block 1130, the method 1100 may include transmitting a report to at least one of the TRPs based on the antenna calibration measurements. In an aspect, for example, the UE 104, the TX processor 368 and/or the controller/processor 359 may execute the antenna calibration assist component 140 and/or the report component 146 to transmit a report to at least one of the TRPs based on the antenna calibration measurements. Accordingly, the UE 104, the TX processor 368, and/or the controller/processor 359 executing the antenna calibration assist component 140 and/or the report component 146 may provide means for transmitting a report to at least one of the TRPs based on the antenna calibration measurements.

Figure 12:
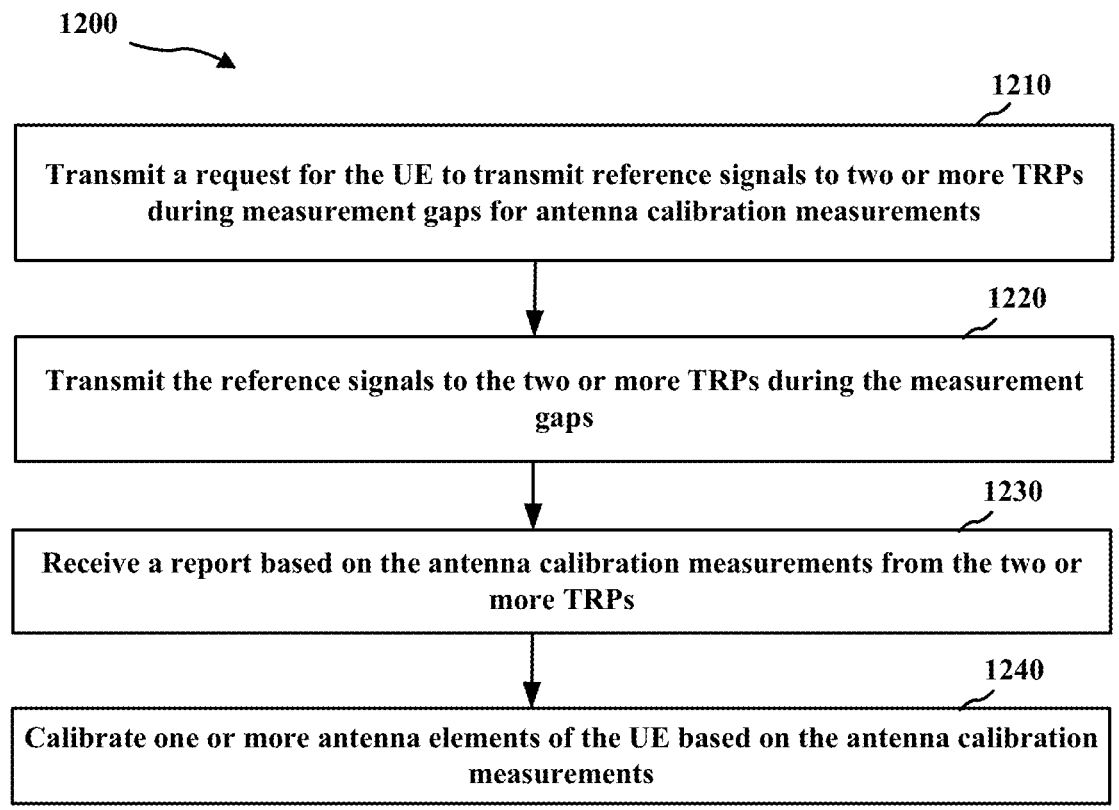
FIG. 12 is a flowchart of an example of a method of wireless communication for a UE to calibrate antennas, in accordance with certain aspects of the present description.

FIG. 12 is a flowchart of an example method 1200 for a UE perform a network calibration procedure based on measurements by two or more TRPs. The method 1200 may be performed by a UE (such as the UE 104, which may include the memory 360 and which may be the entire UE 104 or a component of the UE 104 such as the antenna calibration component 120, TX processor 368, the RX processor 356, or the controller/processor 359). The method 1200 may be performed by the antenna calibration component 120 at the UE 350 in communication with the antenna calibration assist component 140 of the base station 310.

At block 1210, the method 1200 may include transmitting a request for the UE to transmit reference signals to two or more TRPs during measurement gaps for antenna calibration measurements. In an aspect, for example, the UE 104, the TX processor 368 and/or the controller/processor 359 may execute the antenna calibration component 120 and/or the request component 122 to transmit a request for the UE 104 to transmit reference signals to two or more TRPs 412, 414 during measurement gaps 722 for antenna calibration measurements. Accordingly, the UE 104, the TX processor 368, and/or the controller/processor 359 executing the antenna calibration assist component 140 and/or the request component 142 may provide means for transmitting a request for the UE to transmit reference signals to two or more TRPs during measurement gaps for antenna calibration measurements.

At block 1220, the method 1200 may include transmitting the reference signals to the two or more TRPs during the measurement gaps. In an aspect, for example, the UE 104, the TX processor 368 and/or the controller/processor 359 may execute the antenna calibration component 120 and/or the coordination component 124 to transmit the reference signals to the two or more TRPs during the measurement gaps. Accordingly, the UE 104, the TX processor 368, and/or the controller/processor 359 executing the antenna calibration component 120 and/or the coordination component 124 may provide means for transmitting the reference signals to the two or more TRPs during the measurement gaps.

At block 1230, the method 1200 may include receiving a report based on the antenna calibration measurements from the two or more TRPs. In an aspect, for example, the UE 104, the RX processor 356 and/or the controller/processor 359 may execute the antenna calibration component 120 and/or the report component 126 to receive a report based on the antenna calibration measurements from the two or more TRPs. Accordingly, the UE 104, the RX processor 356, and/or the controller/processor 359 executing the antenna calibration component 120 and/or report component 126 may provide means for receiving a report based on the antenna calibration measurements from the two or more TRPs.

At block 1240, the method 1200 may include calibrating one or more antenna elements of the UE based on the antenna calibration measurements. In an aspect, for example, the UE 104, the RX processor 356 and/or the controller/processor 359 may execute the antenna calibration component 120 and/or the calibration component 128 to calibrate one or more antenna elements of the UE 104 based on the antenna calibration measurements. Accordingly, the UE 104, the RX processor 356, and/or the controller/processor 359 executing the antenna calibration component 120 and/or the calibration component 128 may provide means for calibrating one or more antenna elements of the UE based on the antenna calibration measurements.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some Further Example Clauses

Implementation examples are described in the following numbered clauses:

1. A method of wireless communication, comprising:
   transmitting a request for one or more user equipment (UEs) to perform antenna calibration measurements, for two or more transmission reception points (TRPs), during measurement gaps;
   coordinating, among the two or more TRPs, transmission of reference signals during the measurement gaps;
   receiving a report based on the antenna calibration measurements from the one or more UEs; and
   calibrating one or more antenna elements of the two or more TRPs based on the antenna calibration measurements.

2. The method of clause 1, further comprising selecting the one or more UEs based on at least one of: capabilities of the one or more UEs, power or thermal overheads of the one or more UEs, a data rate requirement of the one or more UEs, or a reliability requirement of the one or more UEs.

3. The method of clause 1 or 2, wherein the request configures the measurement gaps for making the antenna calibration measurements.

4. The method of clause 3, wherein a number and periodicity of the measurement gaps are based on at least one of: a number of panels at the two or more TRPs, antenna array geometry and size of the panels at the two or more TRPs, a maximum transmit power level at the two or more TRPs, existing antenna calibration inaccuracies at the two or more TRPs, a number of layers from each TRP, required array gains in downlink at the UE or in uplink at the two or more TRPs, or steering angle of a beam in a beamformed transmission at the two or more TRPs.

5. The method of clause 3, wherein a number and periodicity of the measurement gaps are based on thermal overheads associated with each TRP.

6. The method of any of clauses 1-5, further comprising communicating the received report to another of the two or more TRPs via a backhaul network.

7. The method of any of clauses 1-6, wherein the request includes a joint quasi-co-location (QCL) mapping for reception of transmissions from the TRPs to the one or more UEs.

8. The method of any of clauses 1-7, wherein the report includes a measurement with a fixed receive beam for transmissions from at least one of the two or more TRPs and different receive beams for transmissions from at least another of the two or more TRPs.

9. The method of any of clauses 1-7, wherein coordinating, among the two or more TRPs, the transmission of the reference signals during the measurement gaps comprises performing multi-user multiple-input, multiple-output (MU-MIMO) transmissions to multiple UEs.

10. A method of wireless communication, comprising, by a user equipment (UE):
- receiving a request to perform antenna calibration measurements during measurement gaps, for two or more transmission reception points (TRPs);
- performing the antenna calibration measurements on reference signals from the two or more TRPs during the measurement gaps; and
- transmitting a report to at least one of the TRPs based on the antenna calibration measurements.

11. The method of clause 10, wherein performing the antenna calibration measurements comprises performing measurements with a fixed receive beam for transmissions from at least one of the two or more TRPs and different receive beams for transmissions from at least another of the two or more TRPs.

12. The method of clause 10 or 11, wherein the request includes a joint quasi-co-location (QCL) mapping for reception of transmissions from the two or more TRPs to the UE.

13. The method of clause 10, wherein performing the antenna calibration measurements comprises performing measurements of multi-user multiple-input, multiple-output (MU-MIMO) transmissions with different receive beams to measure an impact of side lobes or beam nulls.

14. The method of any of clauses 10-13, wherein the request configures the measurement gaps for making the antenna calibration measurements.

15. The method of any of clauses 10-13, wherein the UE suspends signaling with a serving cell during the measurement gaps.

16. A method of wireless communication, comprising, at a user equipment (UE):
- transmitting a request for the UE to transmit reference signals to two or more transmission-reception points (TRPs) during measurement gaps for antenna calibration measurements;
- transmitting the reference signals to the two or more TRPs during the measurement gaps;
- receiving a report based on the antenna calibration measurements from the two or more TRPs; and
- calibrating one or more antenna elements of the UE based on the antenna calibration measurements.

17. The method of clause 16, wherein the TRPs configure the measurement gaps in response to the request.

18. An apparatus for wireless communication, comprising:
- a memory storing computer-executable instructions; and
- at least one processor coupled to the memory and configured to execute the computer-executable instructions to:
  - transmit a request for one or more user equipment (UEs) to perform antenna calibration measurements, for two or more transmission reception points (TRPs), during measurement gaps;
  - coordinate, among the two or more TRPs, transmission of reference signals during the measurement gaps;
  - receive a report based on the antenna calibration measurements from the one or more UEs; and
  - calibrate one or more antenna elements of the two or more TRPs based on the antenna calibration measurements.

19. The apparatus of clause 18, wherein the at least one processor is configured to select the one or more UEs based on at least one of: capabilities of the one or more UEs, power or thermal overheads of the one or more UEs, a data rate requirement of the one or more UEs, or a reliability requirement of the one or more UEs.

20. The apparatus of clause 18 or 19, wherein the request configures the measurement gaps for making the antenna calibration measurements.

21. The apparatus of clause 20, wherein a number and periodicity of the measurement gaps are based on at least one of: a number of panels at the two or more TRPs, antenna array geometry and size of the panels at the two or more TRPs, a maximum transmit power level at the two or more TRPs, existing antenna calibration inaccuracies at the two or more TRPs, a number of layers from each TRP, required array gains in downlink at the UE or in uplink at the two or more TRPs, or steering angle of a beam in a beamformed transmission at the two or more TRPs.

22. The apparatus of clause 20, wherein a number and periodicity of the measurement gaps are based on thermal overheads associated with each TRP.

23. The apparatus of any of clauses 18-22, wherein the at least one processor is configured to communicate the received report to another of the two or more TRPs via a backhaul network.

24. The apparatus of any of clauses 18-23, wherein the request includes a joint quasi-co-location (QCL) mapping for reception of transmissions from the TRPs to the one or more UEs.

25. The apparatus of any of clauses 18-24, wherein the report includes a measurement with a fixed receive beam for transmissions from at least one of the two or more TRPs and different receive beams for transmissions from at least another of the two or more TRPs.

26. The apparatus of any of clauses 18-24, wherein the at least one processor is configured to perform multi-user multiple-input, multiple-output (MU-MIMO) transmissions to multiple UEs.

27. An apparatus of a user equipment (UE) for wireless communication, comprising:
- a memory storing computer-executable instructions; and
- at least one processor coupled to the memory and configured to execute the computer-executable instructions to:
  - receive a request to perform antenna calibration measurements during measurement gaps, for two or more transmission reception points (TRPs);
  - perform the antenna calibration measurements on reference signals from the two or more TRPs during the measurement gaps; and
  - transmit a report to at least one of the TRPs based on the antenna calibration measurements.

28. The apparatus of clause 27, wherein the at least one processor is configured to perform measurements with a fixed receive beam for transmissions from at least one of the two or more TRPs and different receive beams for transmissions from at least another of the two or more TRPs.

29. The apparatus of clause 27 or 28, wherein the request includes a joint quasi-co-location (QCL) mapping for reception of transmissions from the two or more TRPs to the UE.

30. The apparatus of clause 27, wherein the at least one processor is configured to perform measurements of multi-user multiple-input, multiple-output (MU-MIMO) transmissions with different receive beams to measure an impact of side lobes or beam nulls.

31. The apparatus of any of clauses 27-30, wherein the request configures the measurement gaps for making the antenna calibration measurements.

32. The apparatus of any of clauses 27-31, wherein the UE suspends signaling with a serving cell during the measurement gaps.

33. An apparatus of a user equipment (UE) for wireless communication, comprising:
- a memory storing computer-executable instructions; and
- at least one processor coupled to the memory and configured to execute the computer-executable instructions to:
  - transmit a request for the UE to transmit reference signals to two or more transmission-reception points (TRPs) during measurement gaps for antenna calibration measurements;
  - transmit the reference signals to the two or more TRPs during the measurement gaps;
  - receive a report based on the antenna calibration measurements from the two or more TRPs; and
  - calibrate one or more antenna elements of the UE based on the antenna calibration measurements.

34. The apparatus of clause 33, wherein the TRPs configure the measurement gaps in response to the request.

35. An apparatus for wireless communication, comprising:
- means for transmitting a request for one or more user equipment (UEs) to perform antenna calibration measurements, for two or more transmission reception points (TRPs), during measurement gaps;
- means for coordinating, among the two or more TRPs, transmission of reference signals during the measurement gaps;
- means for receiving a report based on the antenna calibration measurements from the one or more UEs; and
- means for calibrating one or more antenna elements of the two or more TRPs based on the antenna calibration measurements.

36. The apparatus of clause 35, further comprising means for selecting the one or more UEs based on at least one of: capabilities of the one or more UEs, power or thermal overheads of the one or more UEs, a data rate requirement of the one or more UEs, or a reliability requirement of the one or more UEs.

37. The apparatus of clause 35 or 36, wherein the request configures the measurement gaps for making the antenna calibration measurements.

38. The apparatus of clause 37, wherein a number and periodicity of the measurement gaps are based on at least one of: a number of panels at the two or more TRPs, antenna array geometry and size of the panels at the two or more TRPs, a maximum transmit power level at the two or more TRPs, existing antenna calibration inaccuracies at the two or more TRPs, a number of layers from each TRP, required array gains in downlink at the UE or in uplink at the two or more TRPs, or steering angle of a beam in a beamformed transmission at the two or more TRPs.

39. The apparatus of clause 37, wherein a number and periodicity of the measurement gaps are based on thermal overheads associated with each TRP.

40. The apparatus of any of clauses 35-39, further comprising means for communicating the received report to another of the two or more TRPs via a backhaul network.

41. The apparatus of any of clauses 35-40, wherein the request includes a joint quasi-co-location (QCL) mapping for reception of transmissions from the TRPs to the one or more UEs.

42. The apparatus of any of clauses 35-41, wherein the report includes a measurement with a fixed receive beam for transmissions from at least one of the two or more TRPs and different receive beams for transmissions from at least another of the two or more TRPs.

43. The apparatus of any of clauses 35-41, wherein the means for coordinating, among the two or more TRPs, the transmission of the reference signals during the measurement gaps is configured to perform multi-user multiple-input, multiple-output (MU-MIMO) transmissions to multiple UEs.

44. An apparatus of a user equipment (UE) for wireless communication, comprising:
- means for receiving a request to perform antenna calibration measurements during measurement gaps, for two or more transmission reception points (TRPs);
- means for performing the antenna calibration measurements on reference signals from the two or more TRPs during the measurement gaps; and
- means for transmitting a report to at least one of the TRPs based on the antenna calibration measurements.

45. The apparatus of clause 44, wherein the means for performing the antenna calibration measurements is configured to perform measurements with a fixed receive beam for transmissions from at least one of the two or more TRPs and different receive beams for transmissions from at least another of the two or more TRPs.

46. The apparatus of clause 44 or 45, wherein the request includes a joint quasi-co-location (QCL) mapping for reception of transmissions from the two or more TRPs to the UE.

47. The apparatus of clause 44, wherein the means for perform the antenna calibration measurements is configured to perform measurements of multi-user multiple-input, multiple-output (MU-MIMO) transmissions with different receive beams to measure an impact of side lobes or beam nulls.

48. The apparatus of any of clauses 44-47, wherein the request configures the measurement gaps for making the antenna calibration measurements.

49. The apparatus of any of clauses 44-48, wherein the UE suspends signaling with a serving cell during the measurement gaps.

50. An apparatus of a user equipment (UE) for wireless communication, comprising:
- means for transmitting a request for the UE to transmit reference signals to two or more transmission-reception points (TRPs) during measurement gaps for antenna calibration measurements;
- means for transmitting the reference signals to the two or more TRPs during the measurement gaps;
- means for receiving a report based on the antenna calibration measurements from the two or more TRPs; and
- means for calibrating one or more antenna elements of the UE based on the antenna calibration measurements.

51. The apparatus of clause 50, wherein the TRPs configure the measurement gaps in response to the request.

52. A non-transitory computer-readable medium storing computer executable code, the code when executed by a processor causes the processor to:
- transmit a request for one or more user equipment (UEs) to perform antenna calibration measurements, for two or more transmission reception points (TRPs), during measurement gaps;
- coordinate, among the two or more TRPs, transmission of reference signals during the measurement gaps;
- receive a report based on the antenna calibration measurements from the one or more UEs; and
- calibrate one or more antenna elements of the two or more TRPs based on the antenna calibration measurements.

53. The non-transitory computer-readable medium of clause 52, further comprising code to select the one or more UEs based on at least one of: capabilities of the one or more UEs, power or thermal overheads of the one or more UEs, a data rate requirement of the one or more UEs, or a reliability requirement of the one or more UEs.

54. The non-transitory computer-readable medium of clause 52 or 53, wherein the request configures the measurement gaps for making the antenna calibration measurements.

55. The non-transitory computer-readable medium of clause 54, wherein a number and periodicity of the measurement gaps are based on at least one of: a number of panels at the two or more TRPs, antenna array geometry and size of the panels at the two or more TRPs, a maximum transmit power level at the two or more TRPs, existing antenna calibration inaccuracies at the two or more TRPs, a number of layers from each TRP, required array gains in downlink at the UE or in uplink at the two or more TRPs, or steering angle of a beam in a beamformed transmission at the two or more TRPs.

56. The non-transitory computer-readable medium of clause 54, wherein a number and periodicity of the measurement gaps are based on thermal overheads associated with each TRP.

57. The non-transitory computer-readable medium of any of clauses 52-56, further comprising code to communicate the received report to another of the two or more TRPs via a backhaul network.

58. The non-transitory computer-readable medium of any of clauses 52-57, wherein the request includes a joint quasi-co-location (QCL) mapping for reception of transmissions from the TRPs to the one or more UEs.

59. The non-transitory computer-readable medium of any of clauses 52-58, wherein the report includes a measurement with a fixed receive beam for transmissions from at least one of the two or more TRPs and different receive beams for transmissions from at least another of the two or more TRPs.

60. The non-transitory computer-readable medium of any of clauses 52-58, wherein the code to coordinate, among the two or more TRPs, the transmission of the reference signals during the measurement gaps includes code to perform multi-user multiple-input, multiple-output (MU-MIMO) transmissions to multiple UEs.

61. A non-transitory computer-readable medium storing computer executable code, the code when executed by a processor of a user equipment (UE) causes the processor to:
receive a request to perform antenna calibration measurements during measurement gaps, for two or more transmission reception points (TRPs);
perform the antenna calibration measurements on reference signals from the two or more TRPs during the measurement gaps; and
transmit a report to at least one of the TRPs based on the antenna calibration measurements.

62. The non-transitory computer-readable medium of clause 61, wherein the code to perform the antenna calibration measurements comprises performing measurements with a fixed receive beam for transmissions from at least one of the two or more TRPs and different receive beams for transmissions from at least another of the two or more TRPs.

63. The non-transitory computer-readable medium of clause 61 or 62, wherein the request includes a joint quasi-co-location (QCL) mapping for reception of transmissions from the two or more TRPs to the UE.

64. The non-transitory computer-readable medium of clause 61, wherein the code to perform the antenna calibration measurements includes code to perform measurements of multi-user multiple-input, multiple-output (MU-MIMO) transmissions with different receive beams to measure an impact of side lobes or beam nulls.

65. The non-transitory computer-readable medium of any of clauses 61-64, wherein the request configures the measurement gaps for making the antenna calibration measurements.

66. The non-transitory computer-readable medium of any of clauses 61-65, wherein the UE suspends signaling with a serving cell during the measurement gaps.

67. A non-transitory computer-readable medium storing computer executable code, the code when executed by a processor of a user equipment (UE) causes the processor to:
transmit a request for the UE to transmit reference signals to two or more transmission-reception points (TRPs) during measurement gaps for antenna calibration measurements;
transmit the reference signals to the two or more TRPs during the measurement gaps;
receive a report based on the antenna calibration measurements from the two or more TRPs; and
calibrate one or more antenna elements of the UE based on the antenna calibration measurements.

68. The non-transitory computer-readable medium of clause 67, wherein the TRPs configure the measurement gaps in response to the request.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:
1. A method of wireless communication, comprising:
transmitting a request for one or more user equipment (UEs) to perform antenna calibration measurements, for two or more transmission reception points (TRPs), during measurement gaps, wherein the request includes a joint quasi-co-location (QCL) mapping for reception of joint transmissions of reference signals from all of the two or more TRPs to the one or more UEs;

coordinating, among the two or more TRPs, joint transmission of reference signals from all of the two or more TRPs during the measurement gaps based on the joint QCL mapping;

receiving a report based on the antenna calibration measurements from the one or more UEs; and calibrating one or more antenna elements of the two or more TRPs based on the antenna calibration measurements.

2. The method of claim 1, further comprising selecting the one or more UEs based on at least one of: capabilities of the one or more UEs, power or thermal overheads of the one or more UEs, a data rate requirement of the one or more UEs, or a reliability requirement of the one or more UEs.

3. The method of claim 1, wherein the request configures the measurement gaps for making the antenna calibration measurements.

4. The method of claim 3, wherein a number and periodicity of the measurement gaps are based on at least one of: a number of panels at the two or more TRPs, antenna array geometry and size of the panels at the two or more TRPs, a maximum transmit power level at the two or more TRPs, existing antenna calibration inaccuracies at the two or more TRPs, a number of layers from each TRP, required array gains in downlink at the one or more UEs or in uplink at the two or more TRPs, or steering angle of a beam in a beamformed transmission at the two or more TRPs.

5. The method of claim 3, wherein a number and periodicity of the measurement gaps are based on thermal overheads associated with each TRP.

6. The method of claim 1, further comprising communicating the received report to another of the two or more TRPs via a backhaul network.

7. The method of claim 1, wherein the report includes a measurement with a fixed receive beam for transmissions from at least one of the two or more TRPs and different receive beams for transmissions from at least another of the two or more TRPs.

8. The method of claim 1, wherein coordinating, among the two or more TRPs, the transmission of the reference signals during the measurement gaps comprises performing multi-user multiple-input, multiple-output (MU-MIMO) transmissions to multiple UEs.

9. The method of claim 1, wherein the report includes measured phase and amplitude values.

10. A method of wireless communication, comprising, by a user equipment (UE):

receiving a request to perform antenna calibration measurements during measurement gaps, for two or more transmission reception points (TRPs), wherein the request includes a joint quasi-co-location (QCL) mapping for reception of joint transmissions of reference signals from all of the two or more TRPs to the UE;

performing the antenna calibration measurements on joint transmissions of reference signals from all of the two or more TRPs during the measurement gaps based on the joint QCL mapping; and transmitting a report to at least one of the TRPs based on the antenna calibration measurements.

11. The method of claim 10, wherein performing the antenna calibration measurements comprises performing measurements with a fixed receive beam for transmissions from at least one of the two or more TRPs and different receive beams for transmissions from at least another of the two or more TRPs.

12. The method of claim 10, wherein performing the antenna calibration measurements comprises performing measurements of multi-user multiple-input, multiple-output (MU-MIMO) transmissions with different receive beams to measure an impact of side lobes or beam nulls.

13. The method of claim 10, wherein the request configures the measurement gaps for making the antenna calibration measurements.

14. The method of claim 10, wherein the UE suspends signaling with a serving cell during the measurement gaps.

15. The method of claim 10, wherein the report includes measured phase and amplitude values.

16. An apparatus for wireless communication, comprising:

a memory storing computer-executable instructions; and at least one processor coupled to the memory and configured to execute the computer-executable instructions to:

transmit a request for one or more user equipment (UEs) to perform antenna calibration measurements, for two or more transmission reception points (TRPs), during measurement gaps wherein the request includes a joint quasi-co-location (QCL) mapping for reception of joint transmissions of reference signals from all of the two or more TRPs to the one or more UEs;

coordinate, among the two or more TRPs, joint transmission of reference signals from all of the two or more TRPs during the measurement gaps;

receive a report based on the antenna calibration measurements from the one or more UEs; and calibrate one or more antenna elements of the two or more TRPs based on the antenna calibration measurements.

17. The apparatus of claim 16, wherein the at least one processor is configured to select the one or more UEs based on at least one of: capabilities of the one or more UEs, power or thermal overheads of the one or more UEs, a data rate requirement of the one or more UEs, or a reliability requirement of the one or more UEs.

18. The apparatus of claim 16, wherein the request configures the measurement gaps for making the antenna calibration measurements.

19. The apparatus of claim 18, wherein a number and periodicity of the measurement gaps are based on at least one of: a number of panels at the two or more TRPs, antenna array geometry and size of the panels at the two or more TRPs, a maximum transmit power level at the two or more TRPs, existing antenna calibration inaccuracies at the two or more TRPs, a number of layers from each TRP, required array gains in downlink at the one or more UEs or in uplink at the two or more TRPs, or steering angle of a beam in a beamformed transmission at the two or more TRPs.

20. The apparatus of claim 18, wherein a number and periodicity of the measurement gaps are based on thermal overheads associated with each TRP.

21. The apparatus of claim 16, wherein the at least one processor is configured to communicate the received report to another of the two or more TRPs via a backhaul network.

22. The apparatus of claim 16, wherein the report includes a measurement with a fixed receive beam for transmissions from at least one of the two or more TRPs and different receive beams for transmissions from at least another of the two or more TRPs.

23. The apparatus of claim 16, wherein the at least one processor is configured to perform multi-user multiple-input, multiple-output (MU-MIMO) transmissions of the reference signals to multiple UEs during the measurement gaps.

24. An apparatus of a user equipment (UE) for wireless communication, comprising:
a memory storing computer-executable instructions; and
at least one processor coupled to the memory and configured to execute the computer-executable instructions to:
receive a request to perform antenna calibration measurements during measurement gaps, for two or more transmission reception points (TRPs), wherein the request includes a joint quasi-co-location (QCL) mapping for reception of joint transmissions of reference signals from all of the two or more TRPs to the UE;
perform the antenna calibration measurements on joint transmissions of reference signals from all of the two or more TRPs during the measurement gaps based on the joint QCL mapping; and
transmit a report to at least one of the TRPs based on the antenna calibration measurements.

25. The apparatus of claim 24, wherein the at least one processor is configured to perform the measurements with a fixed receive beam for transmissions from at least one of the two or more TRPs and different receive beams for transmissions from at least another of the two or more TRPs.

26. The apparatus of claim 24, wherein the at least one processor is configured to perform the measurements of multi-user multiple-input, multiple-output (MU-MIMO) transmissions with different receive beams to measure an impact of side lobes or beam nulls.

27. The apparatus of claim 24, wherein the request configures the measurement gaps for making the antenna calibration measurements.

28. The apparatus of claim 24, wherein the UE suspends signaling with a serving cell during the measurement gaps.

* * * * *